(12) United States Patent
Matsuura et al.

(10) Patent No.: US 6,683,798 B2
(45) Date of Patent: Jan. 27, 2004

(54) SWITCHING POWER SUPPLY WITH TRANSFER FUNCTION CONTROL CIRCUIT

(75) Inventors: Ken Matsuura, Tokyo (JP); Hiroshi Miyazaki, Tokyo (JP); Masahiko Hirokawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/218,050

(22) Filed: Aug. 13, 2002

(65) Prior Publication Data

US 2003/0035307 A1 Feb. 20, 2003

(30) Foreign Application Priority Data

Aug. 17, 2001 (JP) .......................... 2001-248262

(51) Int. Cl.[7] .................. H02M 3/335; H02M 5/42; H02M 7/44
(52) U.S. Cl. ................... 363/17; 363/98; 363/56.02
(58) Field of Search ................ 363/17, 56.02, 363/56.03, 98, 127

(56) References Cited

U.S. PATENT DOCUMENTS

| | | | |
|---|---|---|---|
| 5,406,468 A | 4/1995 | Booth | 363/21 |
| 5,465,201 A * | 11/1995 | Cohen | 363/21.09 |
| 6,127,814 A * | 10/2000 | Goder | 323/282 |
| 6,188,209 B1 * | 2/2001 | Poon et al. | 323/255 |
| 6,330,169 B2 * | 12/2001 | Mullett et al. | 363/16 |
| 6,396,716 B1 * | 5/2002 | Liu et al. | 363/17 |

* cited by examiner

Primary Examiner—Bao Q. Vu
(74) Attorney, Agent, or Firm—Seed IP Law Group PLLC

(57) ABSTRACT

A switching power supply suitable for driving a load whose load current may fluctuate abruptly comprises a main circuit unit including a switching circuit for converting a DC input voltage to an AC voltage and an output circuit for rectifying the AC voltage to produce a DC output voltage, and a control circuit for controlling the operation of the main circuit unit, the transfer function of the control circuit assuming a first value when the load current supplied by the main circuit unit changes at a rate not exceeding a prescribed rate and assuming a second value exceeding the first value when the load current changes at a rate exceeding the prescribed rate. The switching power supply therefore exhibits markedly improved transient response when the load current changes at a rate exceeding the prescribed rate because the transfer function of the control circuit is increased relative to that under normal condition.

18 Claims, 15 Drawing Sheets

SWITCHING POWER SUPPLY WITH TRANSFER FUNCTION CONTROL CIRCUIT

BACKGROUND OF THE INVENTION

The present invention relates to a switching power supply, particularly to a switching power supply suitable for driving a load whose load current may fluctuate abruptly.

DESCRIPTION OF THE PRIOR ART

The DC/DC converter is a well-known switching power supply. The typical DC/DC converter uses a switching circuit to once convert a direct current input to an alternating current, uses a transformer to transform (step up or step down) the voltage of the alternating current, and uses an output circuit to convert the transformed alternating current to direct current. The DC/DC converter thus provides a DC output of a different voltage from the input voltage.

The switching power supply of this type is equipped with a control circuit that detects the output voltage and controls the switching operation of the switching circuit based on the detected value. This enables the switching power supply to supply a stable operating voltage to the driven load.

When the conventional switching power supply drives a load whose load current (output current from the viewpoint of the switching power supply) changes abruptly, however, it cannot easily maintain a stable output voltage.

This is particularly a problem when driving a CPU (central processing unit), a DSP (digital signal processor) or other such device that has a low operating voltage and requires a large amount of current in the active state but only a slight amount of current in the inactive state. In such a case, the output voltage of the conventional switching power supply is likely to change markedly with an abrupt change in the output current. As CPUs and DSPs operate at very high speeds, moreover, they are apt to malfunction when the output voltage changes, unless it is promptly stabilized.

SUMMARY OF THE INVENTION

It is therefore an object of the present invention to provide a switching power supply suitable for driving a load whose load current may fluctuate abruptly.

Another object of the present invention is to provide a switching power supply that reduces change in output voltage caused by abrupt change in output current.

Another object of the present invention is to provide a switching power supply equipped with a control circuit capable of quickly recovering from change in output voltage caused by abrupt change in output current.

The present invention achieves these objects by providing a switching power supply comprising: a main circuit unit including a switching circuit for converting a DC input voltage to an AC voltage and an output circuit for rectifying the AC voltage to produce a DC output voltage; and a control circuit for controlling the operation of the main circuit unit, the transfer function of the control circuit assuming a first value when the load current supplied by the main circuit unit changes at a rate not exceeding a prescribed rate and assuming a second value exceeding the first value when the load current changes at a rate exceeding the prescribed rate.

The present invention markedly improves transient response when the load current changes at a rate exceeding the prescribed rate because the transfer function of the control circuit is increased relative to that under normal condition.

In a preferred embodiment of the present invention, the second value is set at a level such that a transfer function of a closed loop composed of the switching circuit and the control circuit causes oscillation of the output voltage.

In another preferred embodiment of the present invention, the control circuit includes at least an amplifier that receives the output voltage or a voltage covariant therewith at an input thereof and the switching power supply further comprises means responsive to a change in the load current at a rate exceeding the prescribed rate for changing the level at the input of the amplifier.

In another preferred embodiment of the present invention, the aforesaid means is responsive to an increase in the load current at a rate exceeding the prescribed rate for changing the level at the input of the amplifier in one direction and is responsive to a decrease in the load current at a rate exceeding the prescribed rate for changing the level at the input of the amplifier in the opposite direction.

In another preferred embodiment of the present invention, the aforesaid means is responsive to a change in the load current at a first rate exceeding the prescribed rate for changing the level at the input of the amplifier to a first level and is responsive to a change in the load current at a second rate exceeding the first rate for changing the level at the input of the amplifier to a second level.

In another preferred embodiment of the present invention, the control circuit receives the output voltage or a voltage covariant therewith at an input thereof and includes at least a variable amplifier that assumes a first characteristic when the load current changes at a rate not exceeding the prescribed rate and assumes a second characteristic different from the first characteristic when the load current changes at a rate exceeding the prescribed rate.

In another preferred embodiment of the present invention, the first characteristic is a first gain and the second characteristic is a second gain exceeding the first gain.

In another preferred embodiment of the present invention, the control circuit includes at least a plurality of amplifiers that differ in characteristics and each receive the output voltage or a voltage covariant therewith at inputs thereof, a plurality of PWM (pulse-width modulation) control circuits associated one each with the amplifiers for producing control signal groups based on outputs of the associated amplifiers, and a selector for selecting one signal group from among the control signal groups based on whether or not the load current changed at a rate exceeding the prescribed rate, the operation of the main circuit unit being controlled based on the selected control signal group.

In another preferred embodiment of the present invention, the control circuit includes at least a plurality of amplifiers that differ in characteristics and each receive the output voltage or a voltage covariant therewith at inputs thereof, a selector for selecting one output from among outputs of the plurality of amplifiers based on whether or not the load current changed at a rate exceeding the prescribed rate, and a PWM control circuit for producing a control signal group based on the selected output, the operation of the main circuit unit being controlled based on the control signal group.

DESCRIPTION OF THE PREFERRED EMBODIMENTS

Preferred embodiments of the present invention will now be explained in detail with reference to the drawings.

Figure 1:
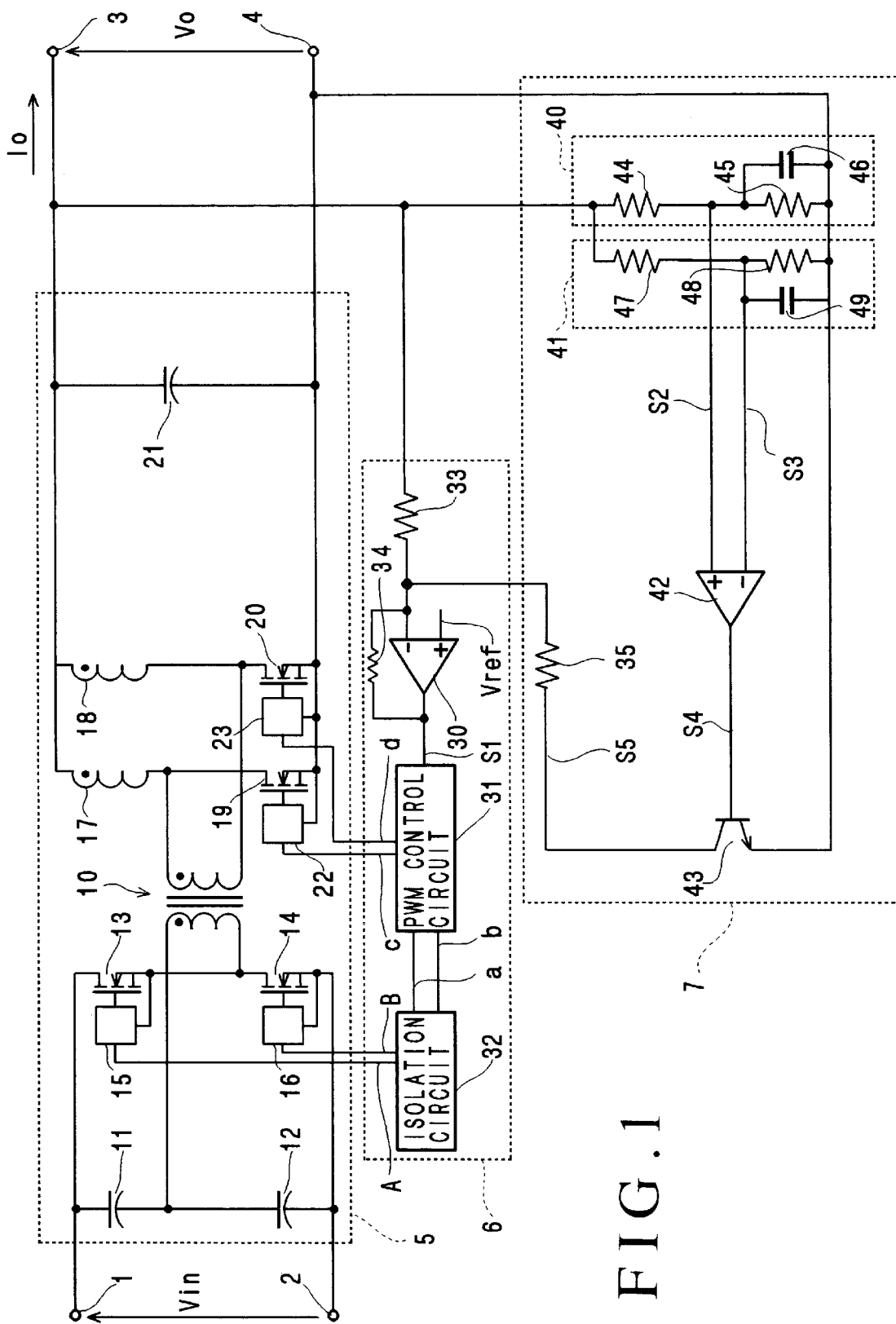
FIG. 1 is a circuit diagram of a switching power supply that is a preferred embodiment of the present invention.

FIG. 1 is a circuit diagram of a switching power supply that is a preferred embodiment of the present invention.

As shown in FIG. 1, the switching power supply of this embodiment transforms a DC input voltage Vin supplied across a pair of input terminals 1 and 2 and supplies an output voltage Vo of prescribed voltage across a pair of output terminals 3 and 4. It is equipped with a main circuit unit 5, a control circuit 6 and an abrupt load change detection circuit 7. The pair of output terminals 3 and 4 are connected to power terminals of a device that, while not particularly limited, is one such as a CPU or DSP that operates at low voltage (e.g., 1 V) and heavy current (e.g., 100 A). A CPU or DSP requires heavy current in the active state but only slight current in the inactive state. In addition, the switching between the active state and the inactive state is extremely fast. The switching power supply according to this embodiment is suitable as the power supply for driving a device (load) exhibiting these properties.

The main circuit unit 5 is equipped with a transformer 10, a half-bridge switching circuit provided on the primary side of the transformer 10 and a current doubler output circuit provided on the secondary side of the transformer 10.

The switching circuit included in the main circuit unit 5 is equipped with a first input capacitor 11 and a second input capacitor 12 connected in series between the pair of input terminals 1 and 2, a first main switch 13 and a second main switch 14 connected in series between the pair of input terminals 1 and 2, a driver 15 for driving the first main switch 13, and a driver 16 for driving the second main switch 14. As illustrated in FIG. 1, the primary winding of the transformer 10 is connected to the connection point between the first and second input capacitors 11 and 12 and to the connection point between the first and second main switches 13 and 14. Any of various known devices and circuits can be used as the first and second main switches 13 and 14.

The output circuit included in the main circuit unit 5 is equipped with a first reactor 17 and a first rectifier switch 19 connected in series between the pair of output terminals 3 and 4, a second reactor 18 and a second rectifier switch 20 connected between the pair of output terminals 3 and 4, an output capacitor 21 connected between the pair of output terminals 3 and 4, a driver 22 for driving the first rectifier switch 19, and a driver 23 for driving the second rectifier switch 20. As illustrated in FIG. 1, the secondary winding of the transformer 10 is connected to the connection point between the first reactor 17 and the first rectifier switch 19 and to the connection point between the second reactor 18 and the second rectifier switch 20. Any of various known devices and circuits can be used as the first and second rectifier switches 19 and 20.

The control circuit 6 is equipped with an amplifier 30, a PWM (pulse-width modulation) control circuit 31, an isolation circuit 32, and resistors 33 and 34.

The amplifier 30 has an inverting input (−), a non-inverting input (+) and an output. The resistor 33 is inserted between and the inverting input (−) the output terminal 3 of the switching power supply, and the resistor 34 is inserted between the inverting input (−) and the output of the amplifier 30. A reference voltage Vref is supplied to the non-inverting input (+). The control signal S1 appearing at the output of the amplifier 30 therefore varies with output voltage Vo appearing at the output terminal 3. More specifically, the level of the control signal S1 appearing at the output of the amplifier 30 decreases with increasing output voltage Vo. Inversely, the level of the control signal S1 appearing at the output of the amplifier 30 increases with decreasing output voltage Vo.

The PWM control circuit 31 receives the control signal S1 supplied from the amplifier 30 and uses it to control the pulse widths of control signals a and b. More specifically, the PWM control circuit 31 expands the pulse widths (increases the duty values) of the control signals a and b with increasing level of the control signal S1. Inversely, it narrows (decreases the duty values) of the control signals a and b with decreasing level of the control signal S1. The control signals a and b are used to control ON/OFF operation of the first main switch 13 and the second main switch 14, respectively. The PWM control circuit 31 also controls the pulse widths of control signals c and d to appropriate values in accordance with the pulse widths of the control signals a and b. The control signals c and d are used to control ON/OFF operation of the first rectifier switch 19 and the second rectifier switch 20, respectively.

The isolation circuit 32 receives the control signals a and b associated with the secondary side of the transformer 10 and converts them into control signals A and B associated with the primary side of the transformer 10. Devices usable as the isolation circuit 32 include, but are not limited to, a transformer, photocoupler or the like.

As shown in FIG. 1, the control signal A is supplied to the driver 15, the control signal B is supplied to the driver 16, the control signal c is supplied to the driver 22, and the control signal d is supplied to the driver 23. Each of these drivers puts the switch it drives in the conducting state when the corresponding control signal is in the active state (e.g., high level) and puts it in the non-conducting state when the corresponding control signal is in the inactive state (e.g., low level).

The abrupt load change detection circuit 7 is equipped with a filter 40, a filter 41, a comparator 42, a transistor 43 and a resistor 35.

The filter 40 comprises resistors 44 and 45 connected in series between the pair of output terminals 3 and 4 and, a capacitor 46 connected in parallel with the resistor 45. The potential at the connection point between the resistors 44 and 45 is used as a control signal S2. Similarly, the filter 41 comprises resistors 47 and 48 connected in series between the pair of output terminals 3 and 4, and a capacitor 49 connected in parallel with the resistor 48. The potential at the connection point between the resistors 47 and 48 is used as a control signal S3. In this configuration, the filter 40 functions as a low-pass circuit filter whose input is the output voltage Vo and output is the control signal S2, and the filter 41 functions as a low-pass filter circuit whose input is the output voltage Vo and output is the control signal S3.

The filter 40 and filter 41 differ in characteristics. Specifically, the time constant of the filter 40 is set larger than that of the filter 41. Therefore, when the output voltage Vo changes, the output of the filter 41 changes more than the output of the filter 40. Moreover, when the output voltage Vo is stable, or when the output voltage Vo changes but the amount of change is small, the level of the output of the filter 40, i.e., the control signal S2, is lower than the level of the output of the filter 41, i.e., the control signal S3. These characteristics are established by appropriately selecting the values of the resistors 44, 45, 47 and 48 and the capacitors 46 and 49 constituting the filters 40 and 41.

The comparator 42 has an inverting input (−), a non-inverting input (+) and an output. The control signal S2 is supplied to the non-inverting input (+) and the control signal S3 is supplied to the inverting input (−). When the level of the control signal S2 is lower than the level of the control signal S3, therefore, the output of the comparator 42 (control signal S4) is low level. Inversely, when the level of the control signal S2 is higher than the level of the control signal S3, the output of the comparator 42, i.e., the control signal S4, is high level. The control signal S4 is used as an abrupt load change detection signal.

The transistor 43, though not particularly limited, can be an NPN bipolar transistor whose base is supplied with the control signal S4. The emitter of the transistor 43 is connected to the output terminal 4 (GND) and the collector of the transistor 43 is connected through a resistor 35 to the inverting input (−) of the amplifier 30.

The operation of switching power supply of this embodiment in the abrupt load change state will now be explained. The term "abrupt load change state" as used here means a condition in which the output current Io varies rapidly.

Figure 2:
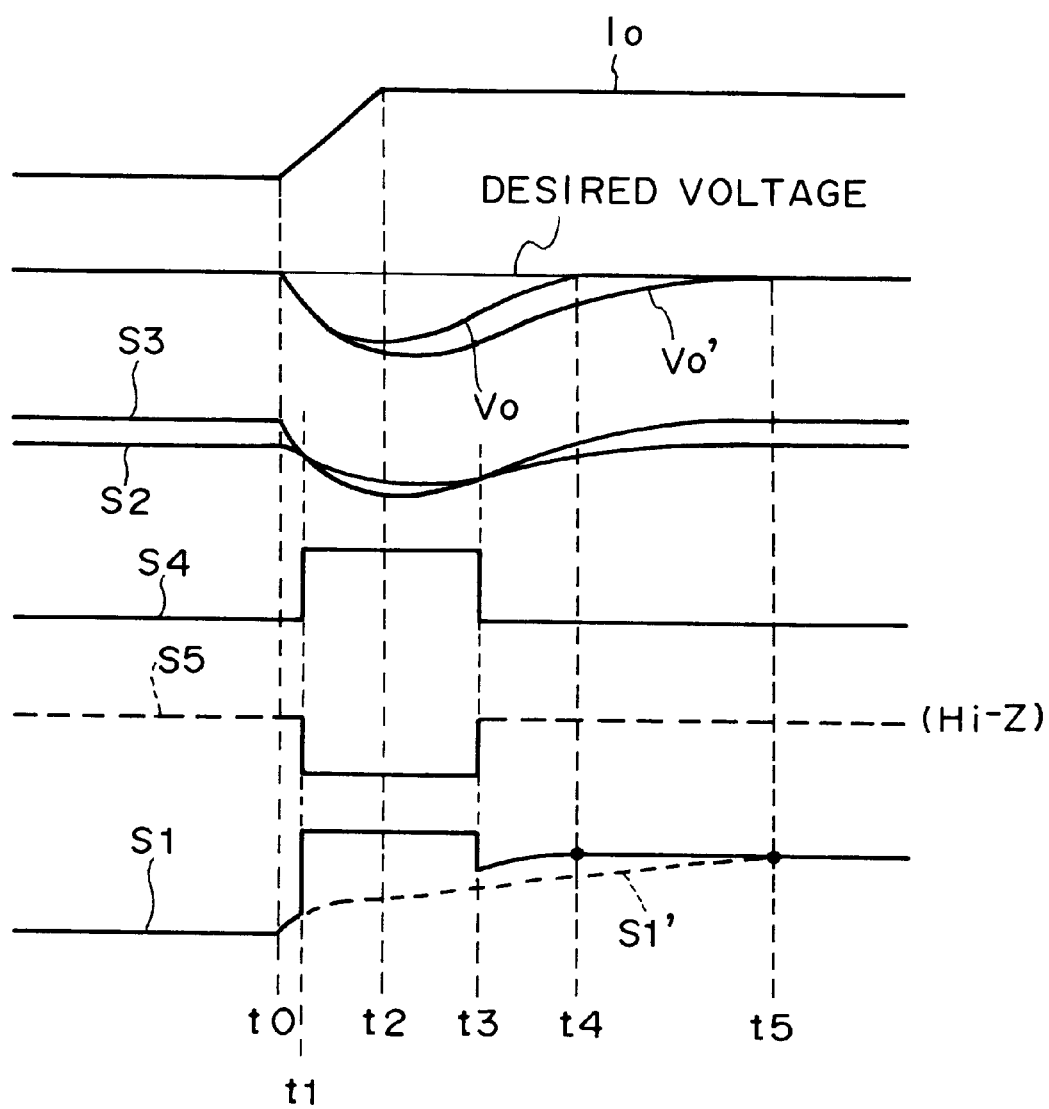
FIG. 2 is a timing chart for explaining the operation of the switching power supply of FIG. 1 in an abrupt load change state.

FIG. 2 is a timing chart for explaining the operation of the switching power supply of this embodiment in an abrupt load change state.

FIG. 2 illustrates the operation of the switching power supply when the amount of output current Io increases rapidly between time t0 and time t2. Such an abrupt change occurs when, for example, the load connected to the pair of output terminals 3 and 4 is a CPU or DSP and the CPU or DSP switches from the inactive state to the active state.

Before time t0 the amount of output current Io is small and is substantially free of fluctuation, so that the output voltage Vo maintains the desired value. In this case, the control signal S2 output by the filter 40 has a lower level than the control signal S3 output by the filter 41, so that control signal S4 output by the comparator 42 maintains a low level. Since the transistor 43 therefore remains OFF, the control signal S5 on the collector of the transistor 43 is in a high impedance state as viewed from the inverting input (−) of the amplifier 30. Before time t0, therefore, the abrupt load change detection circuit 7 has substantially no effect on the operation of the control circuit 6. In this case, the transfer function of the control circuit 6 assumes a first value and the transfer function of the closed loop composed of the main circuit unit 5 and the control circuit 6 is held to a value at which the output voltage Vo does not oscillate.

The output current Io starts to increase rapidly at time t0 and the output voltage Vo starts to decrease rapidly at the same time. Affected by this decrease, the filter 40 lowers the level of the control signal S2 it outputs and the filter 41 lowers the level of the control signal S3 it outputs. The filters 40 and 41 are configured so that for the same change in the output voltage Vo, the change in the control signal S3 output by the filter 41 is greater than the change in the control signal S2 output by the filter 40. At time t1, therefore, the level (magnitude) relationship between the control signal S2 and the control signal S3 reverses. In other words, the control signal S2 comes to have a higher level than the control signal S3.

As a result, the control signal S4 output by the comparator 42 becomes high level and the transistor 43 turns ON. When the transistor 43 turns ON, the level of a control signal S5 assumes the potential of the output terminal 4 (GND) (ground potential). The inverting input (−) of the amplifier 30 is therefore supplied with ground potential through the resistor 35.

The level of the control signal S1 output by the amplifier 30 therefore rises sharply, typically increasing to the saturation level. As a result, the PWM control circuit 31 supplied with the control signal S1 expands the pulse width of the control signals a and b it outputs substantially to the maximum value. The level of the output voltage Vo therefore starts to rise rapidly from its declined state toward the desired voltage. In this condition, the transfer function of the control circuit 6 assumes a second value exceeding the first value. It is acceptable at this time for the level of the transfer function of the closed loop composed of the main circuit unit 5 and the control circuit 6 to become one at which the output voltage Vo oscillates. This condition is maintained until the level relationship between the control signal S2 and control signal S3 again reverses, i.e., until the level of the control signal S2 becomes lower than that of the control signal S3.

When the level of control signal S2 again becomes lower than the level of control signal S3 at time t3, the control signal S4 output by the comparator 42 returns to low level and the transistor 43 resumes the OFF state. As a result, the abrupt load change detection circuit 7 no longer has any substantial effect on the operation of the control circuit 6. Then, at time t4, the output voltage Vo returns to the desired voltage, also stabilizing the level of the control signal S1.

The foregoing operations enable the switching power supply of this embodiment to quickly recover from a rapid decrease in the output voltage Vo caused by an abrupt change in the load condition. The switching power supply therefore exhibits markedly improved transient response.

The waveform of the output voltage Vo and the waveform of the control signal S1 when the abrupt load change detection circuit 7 is removed from the switching power supply of this embodiment are shown in FIG. 2 as Vo' and S1'. As can be seen from FIG. 2, when the abrupt load change detection circuit 7 is removed from the switching power supply of this embodiment, recovery from a rapid decrease in the output voltage Vo caused by an abrupt change in the load condition takes a long time because the gradualness of the rise in the control signal S1 slows the return of the output voltage Vo to the desired voltage. In this embodiment, the output voltage Vo is restored to the desired voltage at time t5, and the level of the control signal S1 is stabilized as a result.

In the switching power supply of this embodiment, therefore, when the output voltage Vo rapidly decreases because of an abrupt change in the load condition, its level can be restored to the desired voltage earlier by a period of time equal to the difference between time t5 and time t4 than when the abrupt load change detection circuit 7 is not provided.

The operation of the switching power supply of this embodiment in the normal state will now be explained. The term "normal state" as used in this specification means a condition in which the output current Io is stable or changes only slightly, i.e., a condition other than the abrupt load change state.

Figure 3:
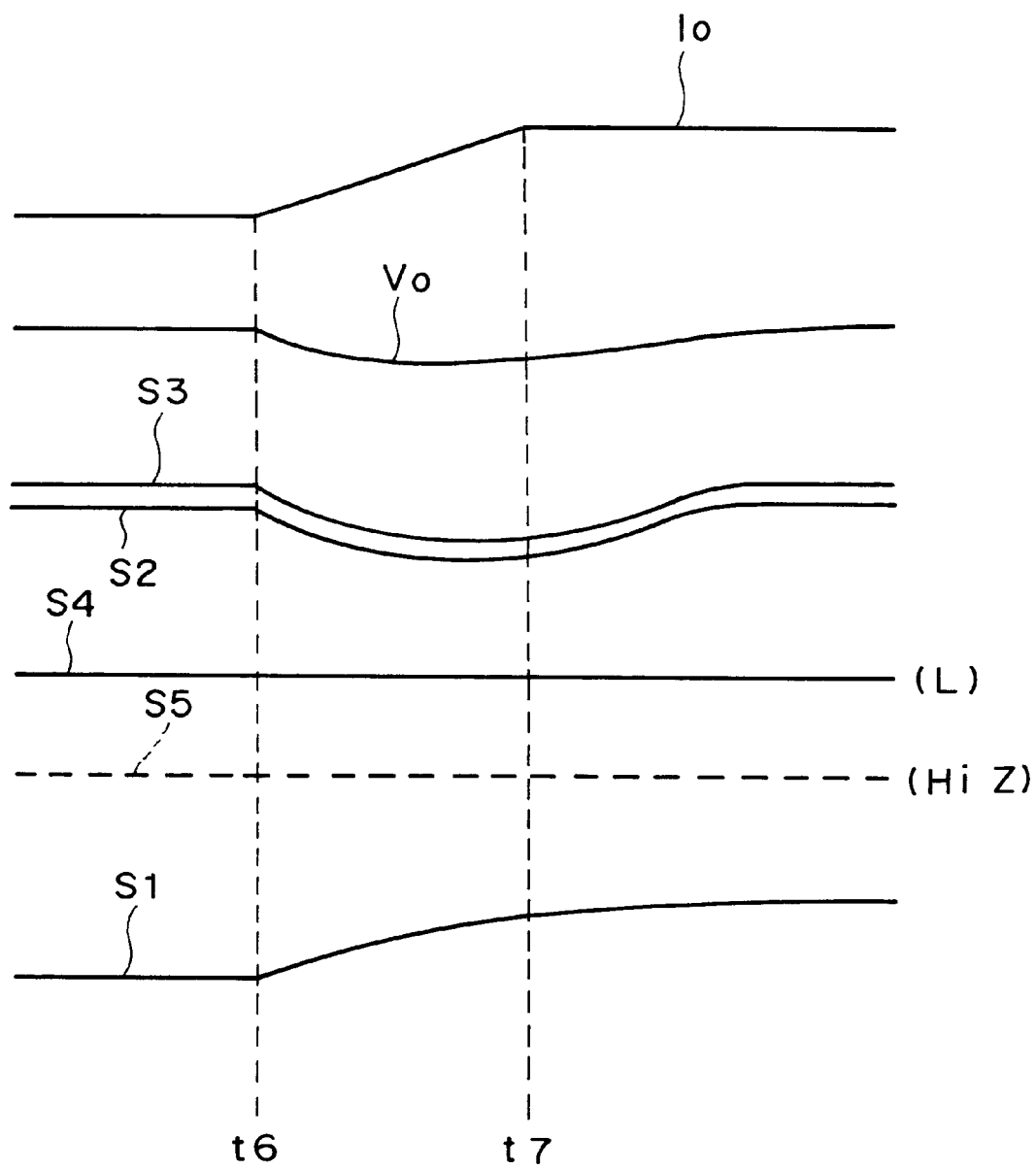
FIG. 3 is a timing chart for explaining the operation of the switching power supply of FIG. 1 in a normal state.

FIG. 3 is a timing chart for explaining the operation of the switching power supply of this embodiment in a normal state. FIG. 3 illustrates the operation of the switching power supply when the amount of output current Io increases relatively gradually from time t6 to time t7 (time t7−time t6>time t2−time t0).

When the amount of output current Io increases relatively gradually, the attendant decrease in the output voltage Vo is also gradual and the level (magnitude) relationship between the control signal S2 and the control signal S3 does not reverse. The control signal S4 output by the comparator 42 therefore stays at low level and the OFF state of the transistor 43 is maintained. As pointed out above, the abrupt load change detection circuit 7 exerts substantially no effect on the operation of the control circuit 6 when the transistor 43 is OFF. The switching power supply of this embodiment is therefore capable of operating normally in the normal state.

As explained in the foregoing, the switching power supply of this embodiment can recover quickly from a rapid decrease in the output voltage Vo caused by an abrupt change in the load condition. When a CPU or DSP is driven as a load, therefore, malfunctions caused by power supply voltage fluctuation can be effectively prevented.

Since the switching power supply of this embodiment detects abrupt load change states using the filters 40 and 41, which function as low-pass filters, it is possible to preclude malfunctions that might arise should the ripple voltage variations produced in connection with the switching operations of the main circuit unit 5 be mistakenly taken as indicating an abrupt load change state.

In the switching power supply of this embodiment, abrupt load change states are indirectly detected by monitoring the output voltage Vo. This avoids the power loss and operation delays that would occur if the output current Io were directly detected using a resistor, current transformer or the like. A switching power supply can therefore be provided that is suitable for the case of conducting voltage detection by the so-called remote sensing method in which the output capacitor 21 of the switching power supply is installed near a load located relatively far from the switching power supply proper so as to position the output voltage Vo detection point near the load.

Another conceivable way of quickly recovering from a rapid decrease in the output voltage Vo caused by an abrupt change in the load condition would be to use a large capacity capacitor as the output capacitor 21. However, this would increase both the overall size and cost of the switching power supply. In contrast, the switching power supply of this embodiment effectively minimizes increase in overall size and cost, while enabling quick recovery from rapid decreases in the output voltage Vo caused by abrupt change in load condition.

Another preferred embodiment of the present invention will now be explained.

Figure 4:
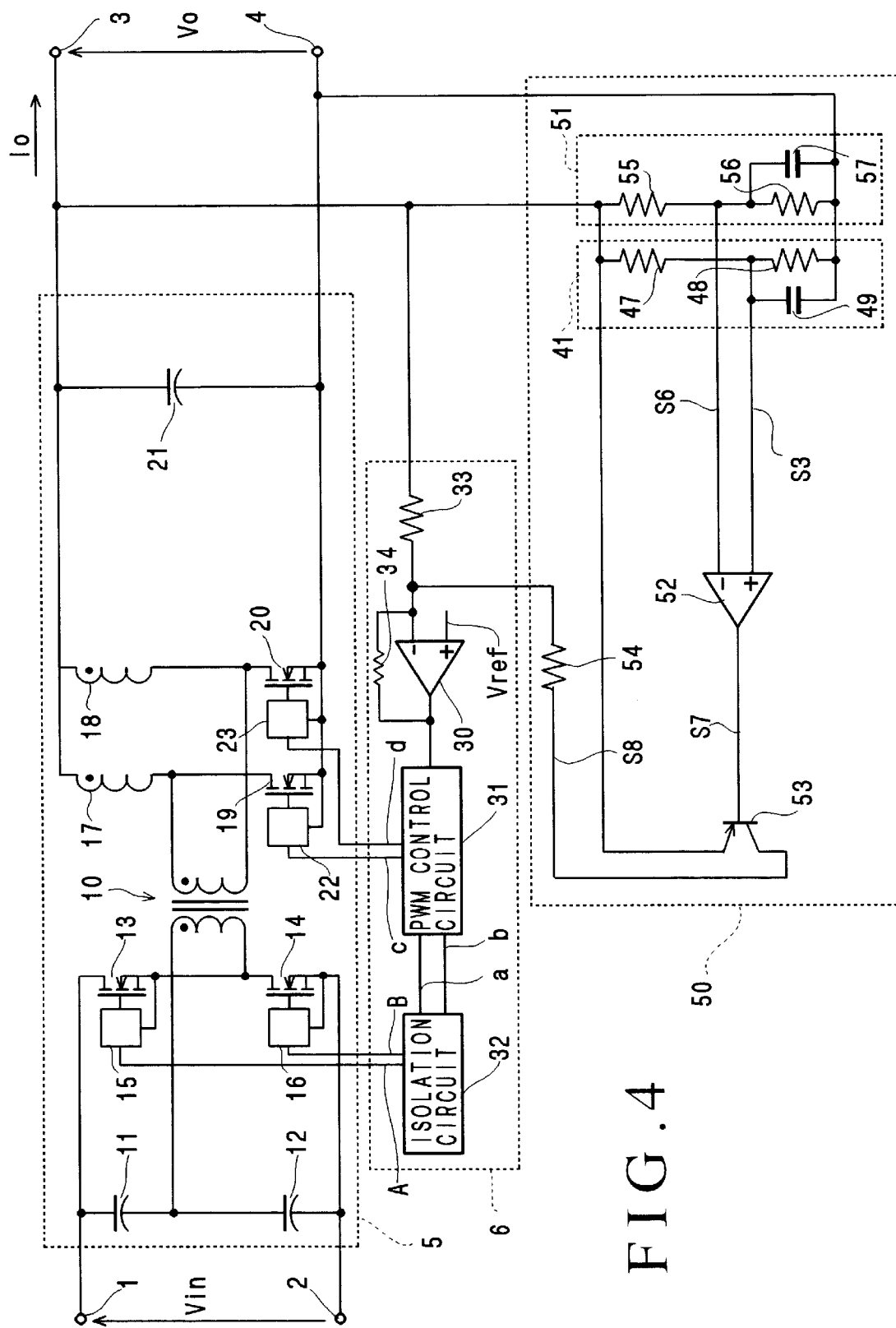
FIG. 4 is a circuit diagram of a switching power supply that is another preferred embodiment of the present invention.

FIG. 4 is a circuit diagram of a switching power supply that is another preferred embodiment of the present invention.

As shown in FIG. 4, the switching power supply of this embodiment differs from the switching power supply of FIG. 1 in that the abrupt load change detection circuit 7 is replaced by an abrupt load change detection circuit 50. Other aspects of the configuration are the same as those of the switching power supply shown in FIG. 1 and explanation thereof will not be repeated here.

The abrupt load change detection circuit 50 is equipped with a filter 41, a filter 51, a comparator 52, a transistor 53 and a resistor 54.

The filter 51 comprises resistors 55 and 56 connected in series between the pair of output terminals 3 and 4 and, a capacitor 57 connected in parallel with the resistor 56. The potential at the connection point between the resistors 55 and 56 is used as a control signal S6. In this configuration, the filter 51 functions as a low-pass circuit filter whose input is the output voltage Vo and output is the control signal S6. The filter 41 is configured and functions as explained earlier.

The filter 41 and filter 51 differ in characteristics. Specifically, the time constant of the filter 41 is set larger than that of the filter 51. Therefore, when the output voltage Vo changes, the output of the filter 51 changes more than the output of the filter 41. Moreover, when the output voltage Vo is stable, or when the output voltage Vo changes but the amount of change is small, the level of the output of the filter 51, i.e., the control signal S6, is lower than the level of the output of the filter 41, i.e., the control signal S3. These characteristics are established by appropriately selecting the values of the resistors 47, 48, 55 and 56 and the capacitors 49 and 57 constituting the filters 41 and 51.

The comparator 52 has an inverting input (−), a non-inverting input (+) and an output. The control signal S3 is supplied to the non-inverting input (+) and the control signal S6 is supplied to the inverting input (−). When the level of the control signal S6 is lower than the level of the control signal S3, therefore, the output of the comparator 52 (control signal S7) is high level. Inversely, when the level of the control signal S6 is higher than the level of the control signal S3, the output of the comparator 52, i.e., the control signal S7, is low level. The control signal S7 is used as an abrupt load change detection signal.

The transistor 53, though not particularly limited, can be a PNP bipolar transistor whose base is supplied with the control signal S7. The emitter of the transistor 53 is connected to the output terminal 3 (Vo) and the collector of the transistor 53 is connected through a resistor 54 to the inverting input (−) of the amplifier 30.

The operation of switching power supply of this embodiment in the abrupt load change state will now be explained.

Figure 5:
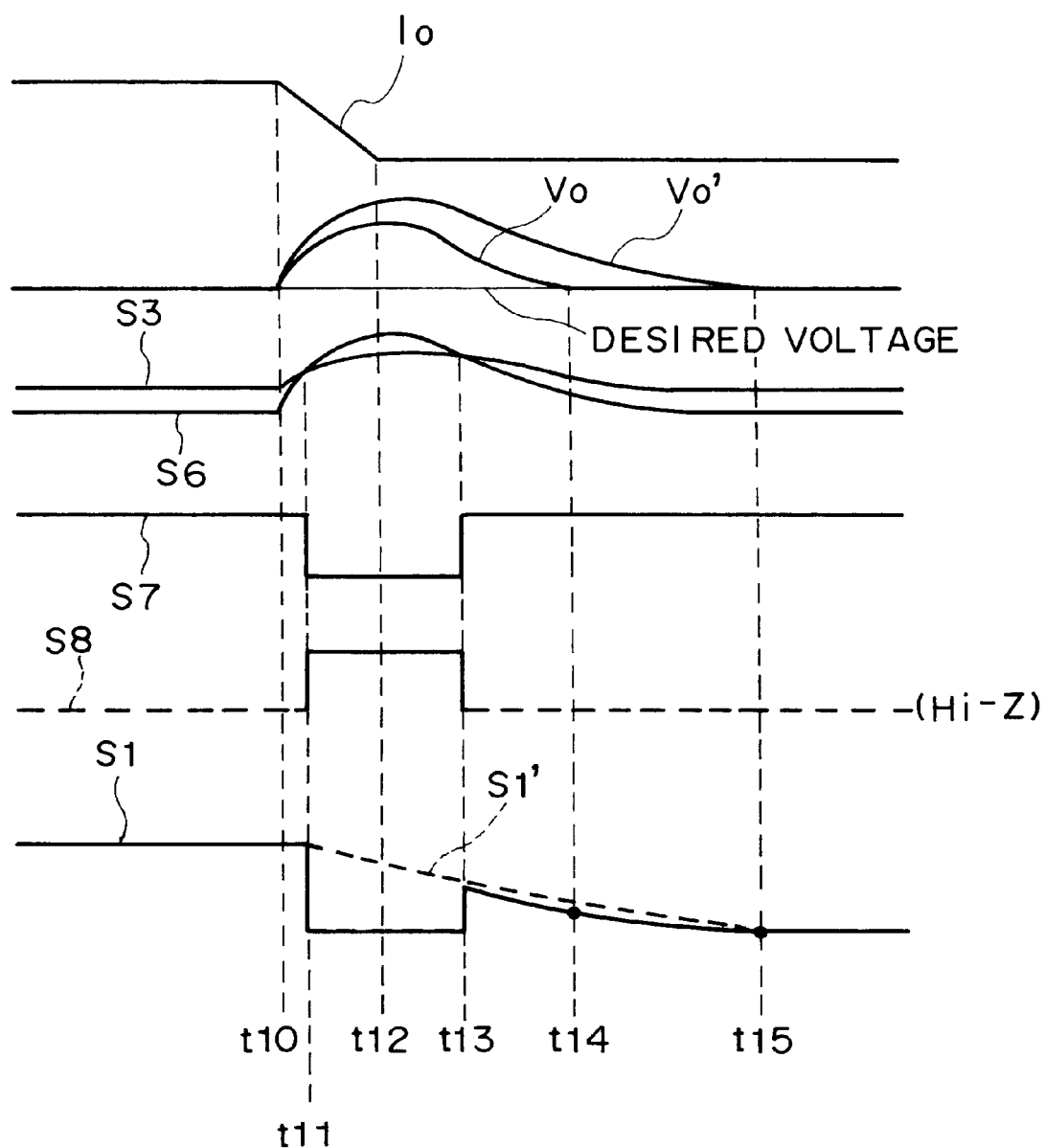
FIG. 5 is a timing chart for explaining the operation of the switching power supply of FIG. 4 in an abrupt load change state.

FIG. 5 is a timing chart for explaining the operation of the switching power supply of this embodiment in an abrupt load change state.

FIG. 5 illustrates the operation of the switching power supply when the amount of output current Io decreases rapidly between time t10 and time t12. Such an abrupt change occurs when, for example, the load connected to the pair of output terminals 3 and 4 is a CPU or DSP and the CPU or DSP switches from the active state to the inactive state.

Before time t10 the amount of output current Io is large and is substantially free of fluctuation, so that the output voltage Vo maintains the desired value. In this case, the control signal S6 output by the filter 51 has a lower level than the control signal S3 output by the filter 41, so that control signal S7 output by the comparator 52 maintains a high level. Since the transistor 53 therefore remains OFF, the control signal S8 on the collector of the transistor 53 is in a high impedance state as viewed from the inverting input (−) of the amplifier 30. Before time t10, therefore, the abrupt load change detection circuit 50 has substantially no effect on the operation of the control circuit 6. In this case, the transfer function of the control circuit 6 assumes a first value and the transfer function of the closed loop composed of the main circuit unit 5 and the control circuit 6 is held to a value at which the output voltage Vo does not oscillate.

The output current Io starts to decrease rapidly at time t10 and the output voltage Vo starts to increase rapidly at the same time. Affected by this rapid increase, the filter 41 raises the level of the control signal S3 it outputs and the filter 51 raises the level of the control signal S6 it outputs. The filters 41 and 51 are configured so that for the same change in the output voltage Vo, the change in the control signal S6 output by the filter 51 is greater than the change in the control signal S3 output by the filter 41. At time t11, therefore, the level (magnitude) relationship between the control signal S3 and the control signal S6 reverses. In other words, the control signal S6 comes to have a higher level than the control signal S3.

As a result, the control signal S7 output by the comparator 52 becomes low level and the transistor 53 turns ON. When the transistor 53 turns ON, the level of a control signal S8 assumes the potential of the output terminal 3 (Vo) (power supply potential). The inverting input (−) of the amplifier 30 is therefore supplied with power supply potential through the resistor 54.

The level of the control signal S1 output by the amplifier 30 therefore falls sharply, typically decreasing to the minimum level. As a result, the PWM control circuit 31 supplied with the control signal S1 narrows the pulse width of the control signals a and b it outputs substantially to the minimum value. The level of the output voltage Vo therefore starts to fall rapidly from its elevated state toward the desired voltage. In this condition, the transfer function of the control circuit 6 assumes a second value exceeding the first value. It is acceptable at this time for the level of the transfer function of the closed loop composed of the main circuit unit 5 and the control circuit 6 to become one at which the output voltage Vo oscillates. This condition is maintained until the level relationship between the control signal S3 and control signal S6 again reverses, i.e., until the level of the control signal S6 becomes lower than that of the control signal S3.

When the level of control signal S6 again becomes lower than the level of control signal S3 at time t13, the control signal S7 output by the comparator 52 returns to high level and the transistor 53 resumes the OFF state. As a result, the abrupt load change detection circuit 50 no longer has any substantial effect on the operation of the control circuit 6. Then, at time t14, the output voltage Vo returns to the desired voltage, also stabilizing the level of the control signal S1.

The foregoing operations enable the switching power supply of this embodiment to quickly recover from a rapid increase in the output voltage Vo caused by an abrupt change in the load condition. The switching power supply therefore exhibits markedly improved transient response.

The waveform of the output voltage Vo and the waveform of the control signal S1 when the abrupt load change detection circuit 50 is removed from the switching power supply of this embodiment are shown in FIG. 5 as Vo' and S1'. As can be seen from FIG. 5, when the abrupt load change detection circuit 50 is removed from the switching power supply of this embodiment, recovery from a rapid increase in the output voltage Vo caused by an abrupt change in the load condition takes a long time because the gradualness of the decline in the control signal S1 slows the return of the output voltage Vo to the desired voltage. In this embodiment, the output voltage Vo is restored to the desired voltage at time t15, and the level of the control signal S1 is stabilized as a result.

In the switching power supply of this embodiment, therefore, when the output voltage Vo rapidly increases because of an abrupt change in the load condition, its level can be restored to the desired voltage earlier by a period of time equal to the difference between time t15 and time t14 than when the abrupt load change detection circuit 50 is not provided.

The operation of the switching power supply of this embodiment in the normal state will now be explained.

Figure 6:
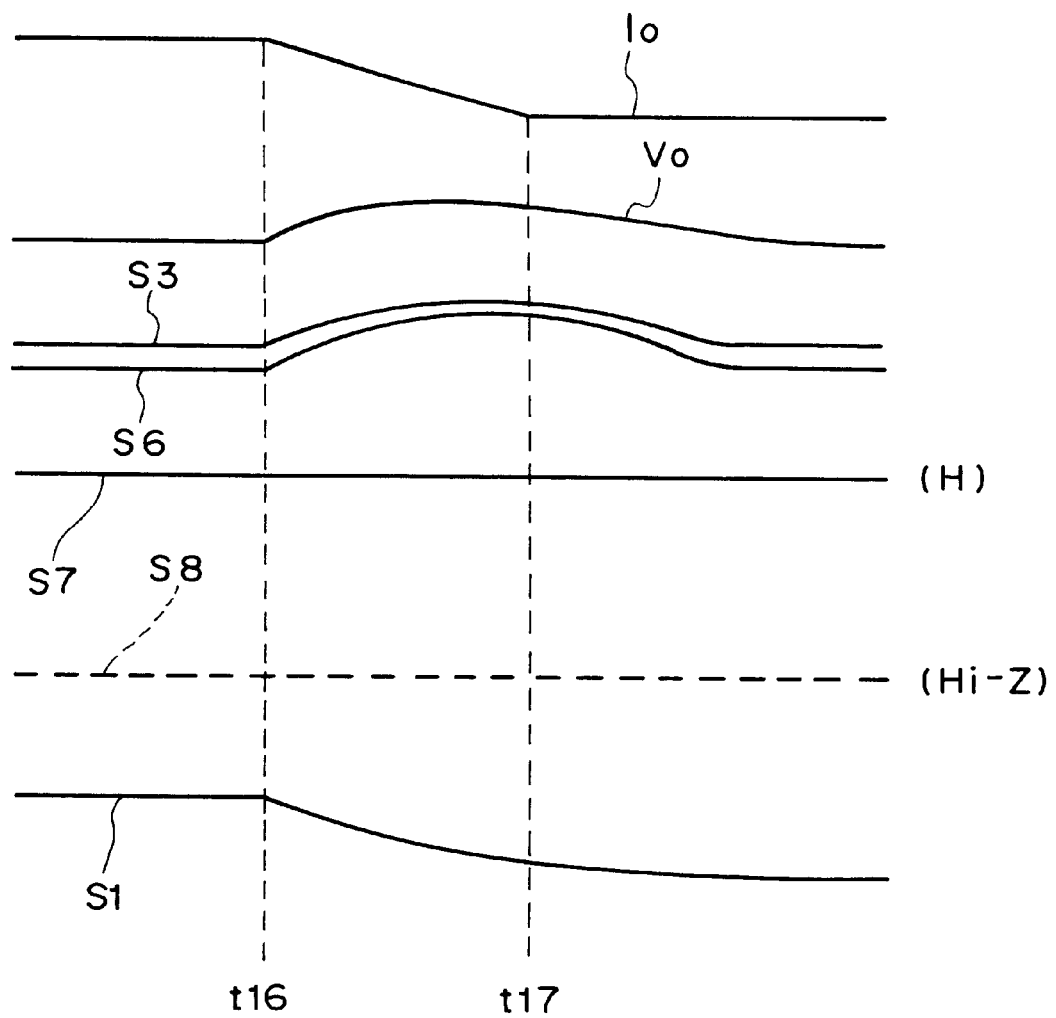
FIG. 6 is a timing chart for explaining the operation of the switching power supply of FIG. 4 in a normal state.

FIG. 6 is a timing chart for explaining the operation of the switching power supply of this embodiment in a normal state. FIG. 6 illustrates the operation of the switching power supply when the amount of output current Io decreases relatively gradually from time t16 to time t17 (time t17−time t16>time t12−time t10).

When the amount of output current Io decreases relatively gradually, the attendant increase in the output voltage Vo is also gradual and the level (magnitude) relationship between the control signal S3 and the control signal S6 does not reverse. The control signal S7 output by the comparator 52 therefore stays at high level and the OFF state of the transistor 53 is maintained. As pointed out above, the abrupt load change detection circuit 50 exerts substantially no effect on the operation of the control circuit 6 when the transistor 53 is OFF. The switching power supply of this embodiment is therefore capable of operating normally in the normal state.

As explained in the foregoing, the switching power supply of this embodiment can recover quickly from a rapid increase in the output voltage Vo caused by an abrupt change in the load condition. When a CPU or DSP is driven as a load, therefore, malfunctions caused by power supply voltage fluctuation can be effectively prevented.

Another preferred embodiment of the present invention will now be explained.

Figure 7:
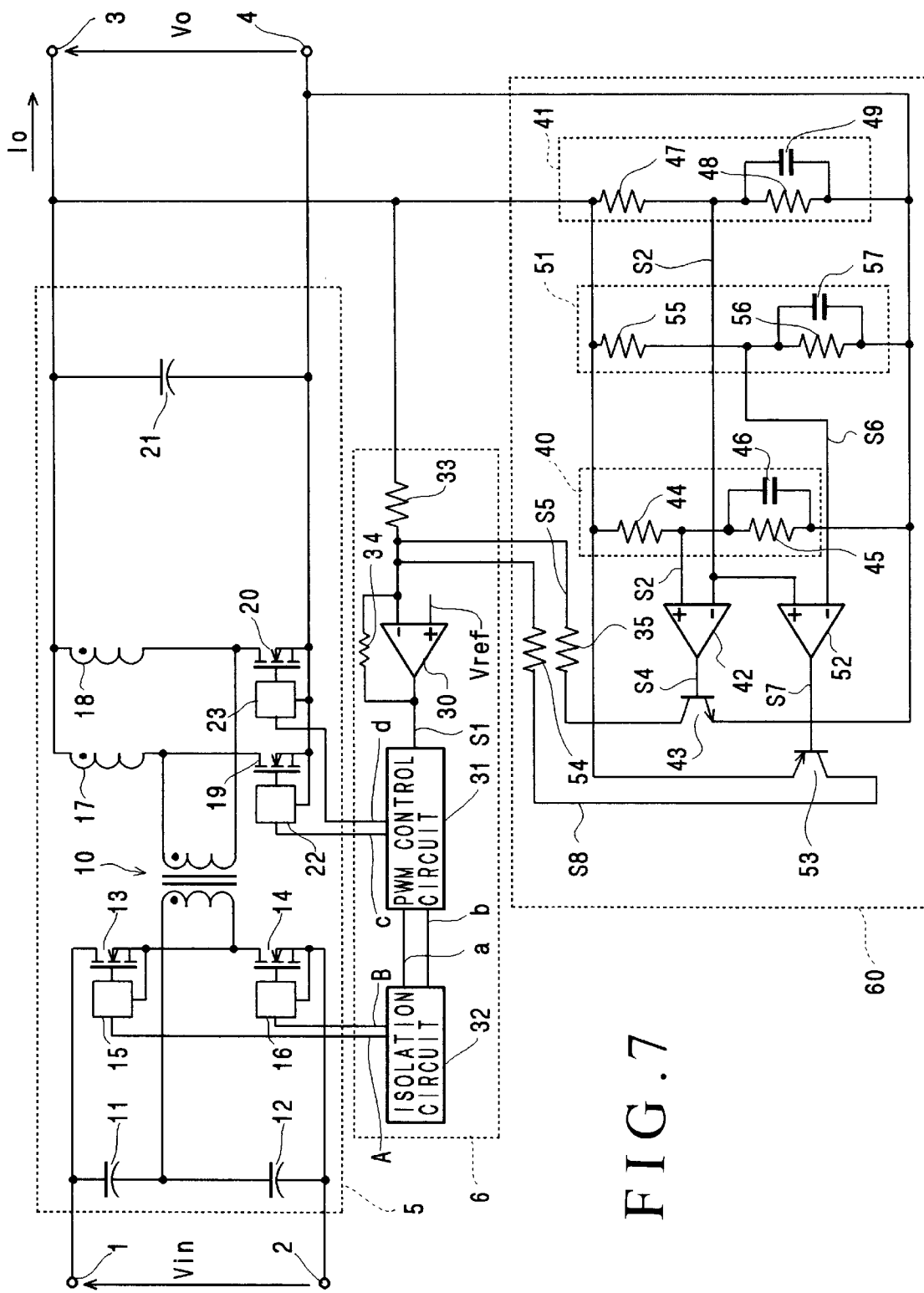
FIG. 7 is a circuit diagram of a switching power supply that is another preferred embodiment of the present invention.

FIG. 7 is a circuit diagram of a switching power supply that is another preferred embodiment of the present invention.

As shown in FIG. 7, the switching power supply of this embodiment differs from the switching power supply of FIG. 1 in that the abrupt load change detection circuit 7 is replaced by an abrupt load change detection circuit 60. Other aspects of the configuration are the same as those of the switching power supply shown in FIG. 1 and explanation thereof will not be repeated here.

The abrupt load change detection circuit 60 is equipped with a filter 40, a filter 41, a filter 51, a comparator 42, a comparator 52, a transistor 43, a transistor 53, and resistors 35 and 54.

The filters 40, 41 and 51, configured as explained earlier, produce control signals S3, S2 and S6, respectively. Similarly to what was explained in the foregoing, the comparators 42 and 51 receive the corresponding control signals and produce control signals S4 and control signal S7 based thereon. Also similarly to what was explained in the foregoing, the base of the transistor 43 is supplied with the control signal S4 and the collector thereof is connected to the inverting input (−) of the amplifier 30 through a resistor 35. Likewise, the base of the transistor 53 is supplied with the control signal S7 and the collector thereof is connected to the inverting input (−) of the amplifier 30 through a resistor 54.

As explained earlier, the time constant of the filter 40 is set larger than that of the filter 41, and the time constant of the filter 41 is set larger than that of the filter 51. Therefore, when the output voltage Vo changes, the output of the filter 41 changes more than the output of the filter 40 and the output of the filter 51 changes more than the output of the filter 41. Moreover, when the output voltage Vo is stable, or when the output voltage Vo changes but the amount of change is small, the level of the output of the filter 40, i.e., the control signal S2, is lower than the level of the output of the filter 41, i.e., the control signal S3, and the level of the output of the filter 51, i.e., the control signal S6, is lower than the level of the output of the filter 41, i.e., the control signal S3.

The switching power supply equipped with the abrupt load change detection circuit 60 provides both the functional capability of the switching power supply shown in FIG. 1 and functional capability of the switching power supply shown in FIG. 4. That is to say, when the output voltage Vo decreases rapidly owing to an abrupt change in the load condition, the level of the control signal S1 can be rapidly increased because the control signal S4 output by the comparator 42 is activated (becomes high level). On the other hand, when the output voltage Vo increases rapidly owing to an abrupt change in the load condition, the level of the control signal S1 can be rapidly decreased because the control signal S7 output by the comparator 52 is activated (becomes low level). In the normal state, moreover, the abrupt load change detection circuit 60 has substantially no effect on the operation of the control circuit 6.

Hence, the switching power supply of this embodiment can recover quickly from a rapid decrease or increase in the output voltage Vo caused by an abrupt change in the load condition. When, for example, a CPU or DSP is driven as a load, therefore, it is possible to effectively prevent malfunctions that otherwise might be caused by power supply voltage fluctuations occurring when the CPU or DSP switches from the active state to the inactive state or from the inactive state to the active state.

Another preferred embodiment of the present invention will now be explained.

Figure 8:
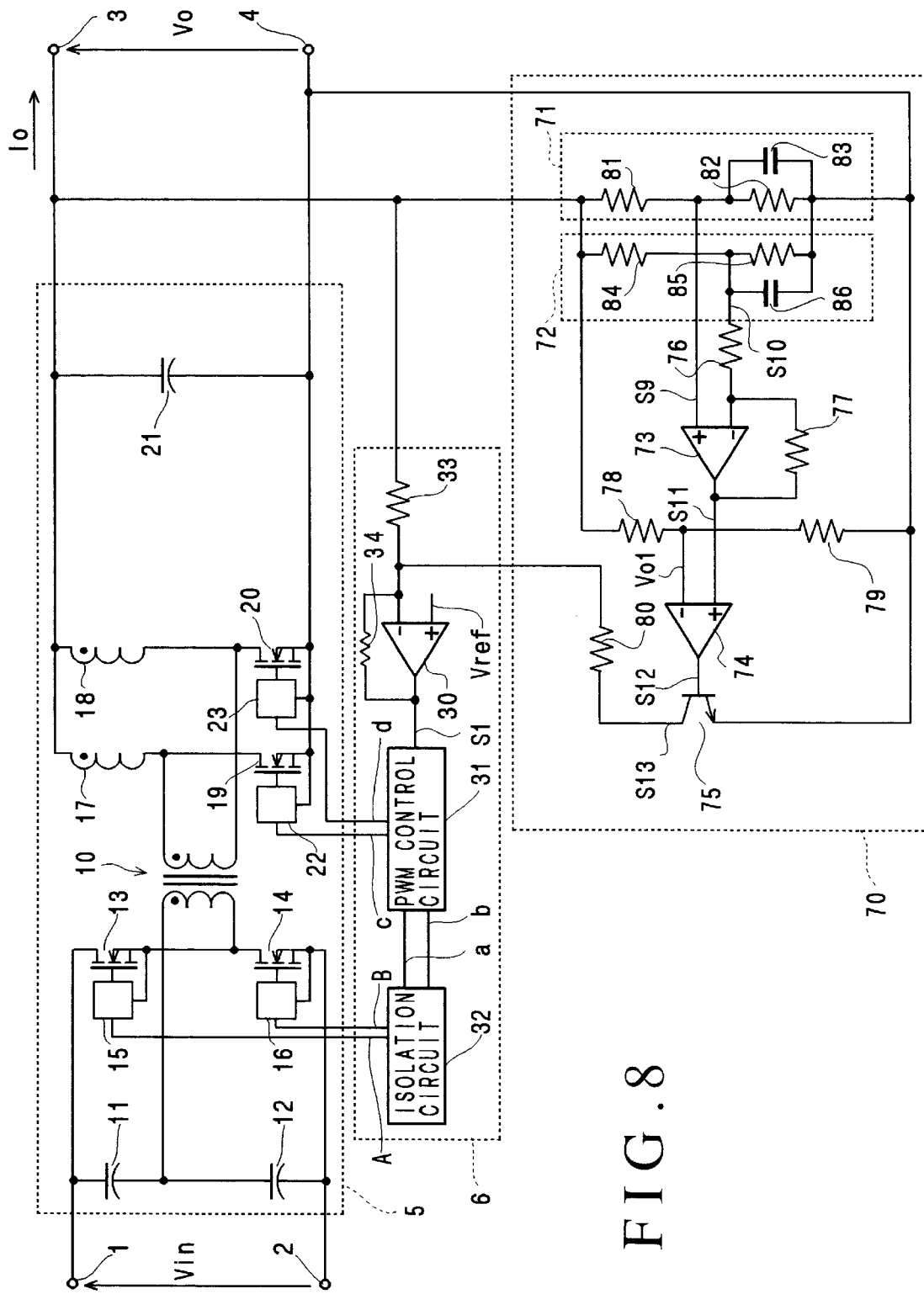
FIG. 8 is a circuit diagram of a switching power supply that is another preferred embodiment of the present invention.

FIG. 8 is a circuit diagram of a switching power supply that is another preferred embodiment of the present invention.

As shown in FIG. 8, the switching power supply of this embodiment differs from the switching power supply of FIG. 1 in that the abrupt load change detection circuit 7 is replaced by an abrupt load change detection circuit 70. Other aspects of the configuration are the same as those of the switching power supply shown in FIG. 1 and explanation thereof will not be repeated here.

The abrupt load change detection circuit 70 is equipped with a filter 71, a filter 72, a comparator 74, a transistor 75 and resistors 76–80.

The filter 71 comprises resistors 81 and 82 connected in series between the pair of output terminals 3 and 4 and, a capacitor 83 connected in parallel with the resistor 82. The potential at the connection point between the resistors 81 and 82 is used as a control signal S9. The filter 72 comprises resistors 84 and 85 connected in series between the pair of output terminals 3 and 4 and, a capacitor 86 connected in parallel with the resistor 85. The potential at the connection point between the resistors 84 and 85 is used as a control signal S10. In this configuration, the filter 71 functions as a low-pass circuit filter whose input is the output voltage Vo and output is the control signal S9. The filter 72 functions as a low-pass circuit filter whose input is the output voltage Vo and output is the control signal S10.

The filter 71 and filter 72 differ in characteristics. Specifically, the time constant of the filter 71 is set larger than that of the filter 72. Therefore, when the output voltage Vo changes, the output of the filter 72 changes more than the output of the filter 71. Moreover, the configuration is such that when the output voltage Vo is stable, the control signal S9 output by the filter 71 and the control signal S10 output by the filter 72 have substantially the same level. These characteristics are established by appropriately selecting the values of the resistors 81, 82, 84 and 85 and the capacitors 83 and 86 constituting the filters 71 and 72.

An operational amplifier 73 has an inverting input (−), a non-inverting input (+) and an output. A resistor 76 is connected between the inverting input (−) and the filter 72, and a resistor 77 is connected between the inverting input (−) and the output. The operational amplifier 73 therefore functions as an inverting amplifier whose amplification factor is determined by the ratio between the resistance value of the resistor 76 and the resistance value of the resistor 77. The control signal S9 is supplied to the non-inverting input (+) of the operational amplifier 73 and the control signal S10 is supplied to the inverting input (−) thereof. As a result, the level of a control signal S11 output by the operational amplifier 73 becomes higher in proportion as the level of the control signal S10 decreases relative to the level of the control signal S9.

The comparator 74 has an inverting input (−), a non-inverting input (+) and an output. The control signal S11 is supplied to the non-inverting input (+) and a voltage Vo1 obtained by dividing the output voltage Vo using resistors 78 and 79 is supplied to the inverting input (−). When the level of the control signal S11 is lower than the level of the voltage Vo1, therefore, the control signal S12 output by the comparator 74 becomes low level. Inversely, when the level of the control signal S11 is higher than the level of the voltage Vo1, the control signal S12 output by the comparator 74 becomes high level. Although not shown in FIG. 8, a capacitor is preferably added in parallel with the resistor 79 in order to stabilize the voltage Vo1. The control signal S12 is used as an abrupt load change detection signal.

The transistor 75, though not particularly limited, can be an NPN bipolar transistor whose base is supplied with the control signal S12. The emitter of the transistor 75 is connected to the output terminal 4 (GND) and the collector of the transistor 75 is connected through a resistor 80 to the inverting input (−) of the amplifier 30.

The operation of switching power supply of this embodiment in the abrupt load change state will now be explained.

Figure 9:
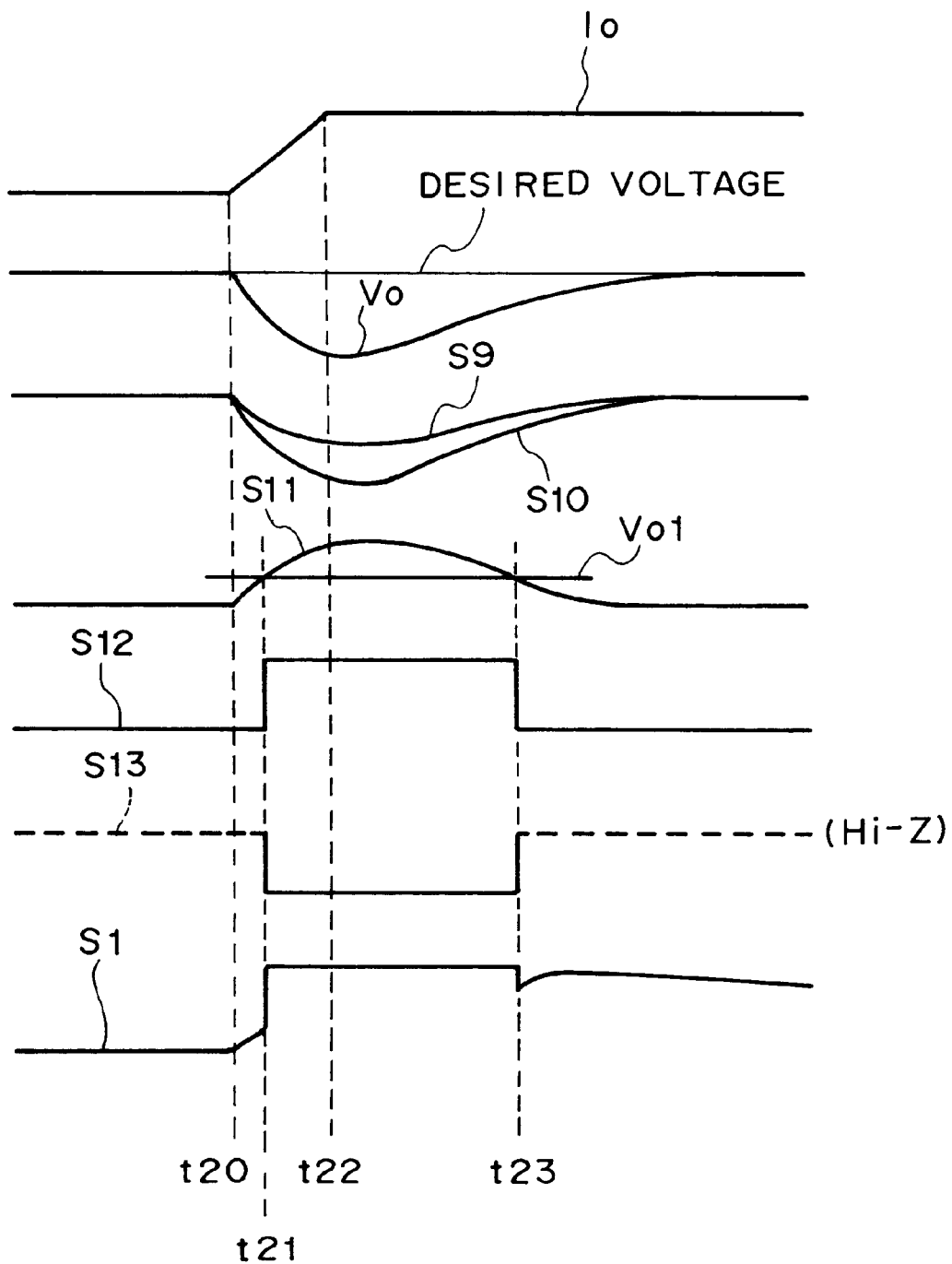
FIG. 9 is a timing chart for explaining the operation of the switching power supply of FIG. 8 in an abrupt load change state.

FIG. 9 is a timing chart for explaining the operation of the switching power supply of this embodiment in an abrupt load change state. FIG. 9 illustrates the operation of the switching power supply when the amount of output current Io increases rapidly between time t20 and time t22.

Before time t20 the amount of output current Io is small and is substantially free of fluctuation, so that the output voltage Vo maintains the desired value. In this case, the levels of the control signal S9 output by the filter 71 and the control signal S10 output by the filter 72 are substantially equal and the control signal S11 output by the operational amplifier 73 is stable at a prescribed level. As shown in FIG. 9, the prescribed level is lower than the voltage Vo1 obtained by dividing the output voltage Vo with the resistors 78 and 79. As a result, the control signal S12 output by the comparator 74 stays at low level. Since the transistor 75 therefore remains OFF, the control signal S13 on the collector of the transistor 75 is in a high impedance state as viewed from the inverting input (−) of the amplifier 30. Before time t20, therefore, the abrupt load change detection circuit 70 has substantially no effect on the operation of the control circuit 6. In this case, the transfer function of the control circuit 6 assumes a first value and the transfer function of the closed loop composed of the main circuit unit 5 and the control circuit 6 is held to a value at which the output voltage Vo does not oscillate.

The output current Io starts to increase rapidly at time t20 and the output voltage Vo starts to decrease rapidly at the same time. Affected by this rapid decrease, the filter 71 lowers the level of the control signal S9 it outputs and the filter 72 lowers the level of the control signal S10 it outputs. The filters 71 and 72 are configured so that for the same change in the output voltage Vo, the change in the control signal S10 output by the filter 72 is greater than the change in the control signal S9 output by the filter 71. The level of the control signal S11 output by the operational amplifier 73 rises in proportion to the difference between the control signal S9 and control signal S10 to exceed the voltage Vo1 at time t21.

As a result, the control signal S12 output by the comparator 74 becomes high level and the transistor 75 turns ON. When the transistor 75 turns ON, the level of a control signal S13 assumes the potential of the output terminal 4 (GND) (ground potential). The inverting input (−) of the amplifier 30 is therefore supplied with ground potential through the resistor 80.

The level of the control signal S1 output by the amplifier 30 therefore rises sharply, typically increasing to the saturation level. As a result, the PWM control circuit 31 supplied with the control signal S1 expands the pulse width of the control signals a and b it outputs substantially to the maximum value. The level of the output voltage Vo therefore starts to rise rapidly from its declined state toward the desired voltage. In this condition, the transfer function of the control circuit 6 assumes a second value exceeding the first value. It is acceptable at this time for the level of the transfer function of the closed loop composed of the main circuit unit 5 and the control circuit 6 to become one at which the output voltage Vo oscillates. This condition is maintained until the level of the control signal S11 output by the operational amplifier 73 again falls below the voltage Vo1.

Although the voltage Vo1 naturally varies together with the output voltage Vo, the variation of the voltage Vo1 with the output voltage Vo is not shown in FIG. 9 because the variation of the output voltage Vo in the same figure is exaggerated.

When the level of control signal S11 again becomes lower than the level of the voltage Vo1 at time t23, the control signal S12 output by the comparator 74 returns to low level and the transistor 75 resumes the OFF state. As a result, the abrupt load change detection circuit 70 no longer has any substantial effect on the operation of the control circuit 6.

The foregoing operations enable the switching power supply of this embodiment to quickly recover from a rapid decrease in the output voltage Vo caused by an abrupt change in the load condition. The switching power supply therefore exhibits markedly improved transient response.

Although the waveforms when the abrupt load change detection circuit 70 is removed from the switching power supply of this embodiment are not shown in FIG. 9, its removal has an effect similar to that in the switching power supply of the preceding embodiments. Namely, the recovery from a rapid decrease in the output voltage Vo caused by an abrupt change in the load condition takes a long time because the gradualness of the rise in the control signal S1 slows the return of the output voltage Vo to the desired voltage.

In the normal state, the change in the output voltage Vo is slight, so that the level of the control signal S11 output by the operational amplifier 73 does not rise above the voltage Vo1. In the normal state, therefore, the control signal S12 output by the comparator 74 stays at low level and the OFF state of the transistor 75 is maintained. As pointed out above, the abrupt load change detection circuit 70 exerts substantially no effect on the operation of the control circuit 6 when the transistor 75 is OFF. The switching power supply of this embodiment is therefore capable of operating normally in the normal state.

As explained in the foregoing, the switching power supply of this embodiment can recover quickly from a rapid decrease in the output voltage Vo caused by an abrupt change in the load condition. When a CPU or DSP is driven as a load, therefore, malfunctions caused by power supply voltage fluctuation can be effectively prevented.

In the switching power supply of this embodiment, moreover, the difference in level between the control signal S9 output by the filter 71 and the control signal S10 output by the filter 72 is amplified by the operational amplifier 73 to produce the control signal S11, which is compared with the voltage Vo1 defined as a threshold. Abrupt load change states can therefore be detected with higher accuracy and stability than in the switching power supply shown in FIG. 1.

In the switching power supply of this embodiment, the voltage Vo1 serving as the threshold is produced based on the output voltage Vo. Therefore, even in a case where the desired value of the output voltage Vo is changed by VID (Voltage Identification) code or droop control for setting the output voltage, the voltage Vo1 can be made to automatically follow the attendant change in the level of the control signal S11. A change in the desired value of the output voltage Vo therefore does not necessitate modification of the control in the abrupt load change detection circuit 70.

Another preferred embodiment of the present invention will now be explained.

Figure 10:
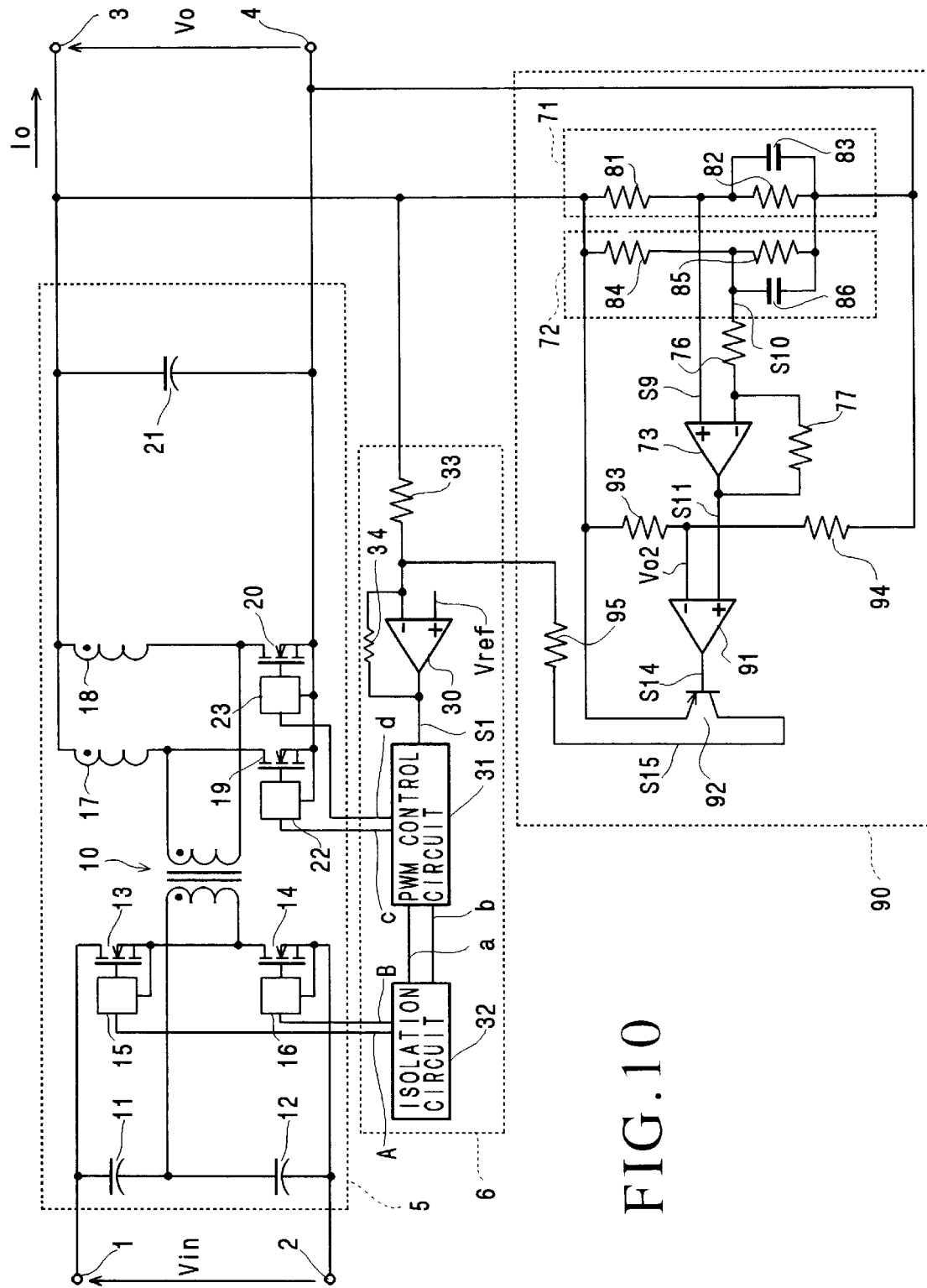
FIG. 10 is a circuit diagram of a switching power supply that is another preferred embodiment of the present invention.

FIG. 10 is a circuit diagram of a switching power supply that is another preferred embodiment of the present invention.

As shown in FIG. 10, the switching power supply of this embodiment differs from the switching power supply of FIG. 1 in that the abrupt load change detection circuit 7 is replaced by an abrupt load change detection circuit 90. Other aspects of the configuration are the same as those of the switching power supply shown in FIG. 1 and explanation thereof will not be repeated here.

The abrupt load change detection circuit 90 is configured similarly to the abrupt load change detection circuit 70 shown in FIG. 8. It differs from the abrupt load change detection circuit 70 in that the comparator 74 is replaced by a comparator 91, the transistor 75 is replaced by a transistor 92, and the resistors 78–80 are replaced by resistors 93–95. Other aspects of the configuration are the same as those of the abrupt load change detection circuit 70 shown in FIG. 8 and explanation thereof will not be repeated here.

The comparator 91 has an inverting input (−), a non-inverting input (+) and an output. The control signal S11 is supplied to the non-inverting input (+) and a voltage Vo2 obtained by dividing the output voltage Vo using resistors 93 and 94 is supplied to the inverting input (−). When the level of the control signal S11 is higher than the level of the voltage Vo2, therefore, the control signal S14 output by the comparator 91 becomes high level. Inversely, when the level of the control signal S11 is lower than the level of the voltage Vo2, the control signal S14 output by the comparator 91 becomes low level. Although not shown in FIG. 10, a capacitor is preferably added in parallel with the resistor 94 in order to stabilize the voltage Vo2. The control signal S14 is used as an abrupt load change detection signal.

The transistor 92, though not particularly limited, can be a PNP bipolar transistor whose base is supplied with the control signal S14. The emitter of the transistor 92 is connected to the output terminal 3 (Vo) and the collector of the transistor 92 is connected through a resistor 95 to the inverting input (−) of the amplifier 30.

The operation of switching power supply of this embodiment in the abrupt load change state will now be explained.

Figure 11:
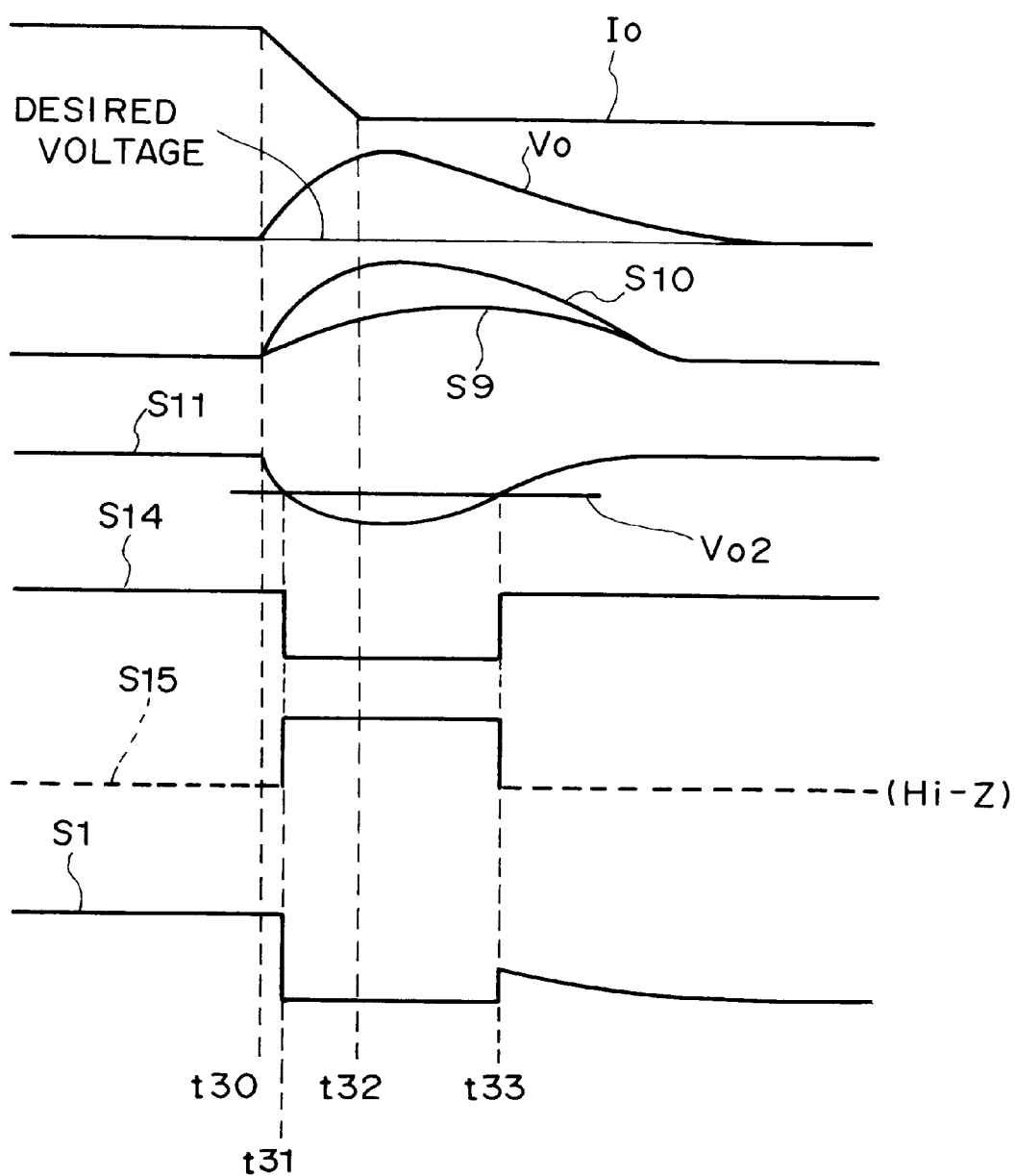
FIG. 11 is a timing chart for explaining the operation of the switching power supply of FIG. 10 in an abrupt load change state.

FIG. 11 is a timing chart for explaining the operation of the switching power supply of this embodiment in an abrupt load change state. FIG. 11 illustrates the operation of the switching power supply when the amount of output current Io increases rapidly between time t30 and time t32.

Before time t30 the amount of output current Io is large and is substantially free of fluctuation, so that the output voltage Vo maintains the desired value. In this case, the levels of the control signal S9 output by the filter 71 and the control signal S10 output by the filter 72 are substantially equal and the control signal S11 output by the operational amplifier 73 is stable at a prescribed level. As shown in FIG. 11, the prescribed level is higher than the voltage Vo2 obtained by dividing the output voltage Vo with the resistors 93 and 94. As a result, the control signal S14 output by the comparator 91 stays at high level. Since the transistor 92 therefore remains OFF, the control signal S15 on the collector of the transistor 92 is in a high impedance state as viewed from the inverting input (−) of the amplifier 30. Before time t30, therefore, the abrupt load change detection circuit 90 has substantially no effect on the operation of the control circuit 6. In this case, the transfer function of the control circuit 6 assumes a first value and the transfer function of the closed loop composed of the main circuit unit 5 and the control circuit 6 is held to a value at which the output voltage Vo does not oscillate.

The output current Io starts to decrease rapidly at time t30 and the output voltage Vo starts to increase rapidly at the same time. Affected by this rapid increase, the filter 71 raises the level of the control signal S9 it outputs and the filter 72 raises the level of the control signal S10 it outputs. The filters 71 and 72 are configured so that for the same change in the output voltage Vo, the change in the control signal S10 output by the filter 72 is greater than the change in the control signal S9 output by the filter 71. The level of the control signal S11 output by the operational amplifier 73 falls in proportion to the difference between the control signal S9 and control signal S10 to fall below the voltage Vo2 at time t31.

As a result, the control signal S14 output by the comparator 91 becomes low level and the transistor 92 turns ON. When the transistor 92 turns ON, the level of a control signal S15 assumes the potential of the output terminal 3 (Vo) (power supply potential). The inverting input (−) of the amplifier 30 is therefore supplied with power supply potential through the resistor 80.

The level of the control signal S1 output by the amplifier 30 therefore falls sharply, typically decreasing to the minimum level. As a result, the PWM control circuit 31 supplied with the control signal S1 narrows the pulse width of the control signals a and b it outputs substantially to the minimum value. The level of the output voltage Vo therefore starts to fall rapidly from its elevated state toward the desired voltage. In this condition, the transfer function of the control circuit 6 assumes a second value exceeding the first value. It is acceptable at this time for the level of the transfer function of the closed loop composed of the main circuit unit 5 and the control circuit 6 to become one at which the output voltage Vo oscillates. This condition is maintained until the level of the control signal S11 output by the operational amplifier 73 again rises above the voltage Vo2.

When the level of control signal S11 again becomes lower than the level of the voltage Vo2 at time t33, the control signal S14 output by the comparator 91 returns to high level and the transistor 92 resumes the OFF state. As a result, the abrupt load change detection circuit 90 no longer has any substantial effect on the operation of the control circuit 6.

The foregoing operations enable the switching power supply of this embodiment to quickly recover from a rapid increase in the output voltage Vo caused by an abrupt change in the load condition. The switching power supply therefore exhibits markedly improved transient response.

Although the waveforms when the abrupt load change detection circuit 90 is removed from the switching power supply of this embodiment are not shown in FIG. 11, its removal has an effect similar to that in the switching power supply of the preceding embodiments. Namely, the recovery from a rapid increase in the output voltage Vo caused by an abrupt change in the load condition takes a long time because the gradualness of the fall in the control signal S1 slows the return of the output voltage Vo to the desired voltage.

In the normal state, the change in the output voltage Vo is slight, so that the level of the control signal S11 output by the operational amplifier 73 does not fall below the voltage Vo2. In the normal state, therefore, the control signal S14 output by the comparator 91 stays at high level and the OFF state of the transistor 92 is maintained. As pointed out above, the abrupt load change detection circuit 90 exerts substantially no effect on the operation of the control circuit 6 when the transistor 92 is OFF. The switching power supply of this embodiment is therefore capable of operating normally in the normal state.

As explained in the foregoing, the switching power supply of this embodiment can recover quickly from a rapid increase in the output voltage Vo caused by an abrupt change in the load condition. When a CPU or DSP is driven as a load, therefore, malfunctions caused by power supply voltage fluctuation can be effectively prevented.

Moreover, in the switching power supply of this embodiment, similarly to in the switching power supply shown in FIG. 8, the difference in level between the control signal S9 output by the filter 71 and the control signal S11 output by the filter 72 is amplified by the operational amplifier 73 to produce the control signal S11, which is compared with the voltage Vo2 defined as a threshold. Abrupt load change states can therefore be detected with higher accuracy and stability than in the switching power supply shown in FIG. 1.

In the switching power supply of this embodiment, similarly to in the switching power supply shown in FIG. 8, the voltage Vo2 serving as the threshold is produced based on the output voltage Vo. Therefore, even in a case where the desired value of the output voltage Vo is changed by VID (Voltage Identification) code or droop control for setting the output voltage, the voltage Vo2 can be made to automatically follow the attendant change in the level of the control signal S11. A change in the desired value of the output voltage Vo therefore does not necessitate modification of the control in the abrupt load change detection circuit 90.

Another preferred embodiment of the present invention will now be explained.

Figure 12:
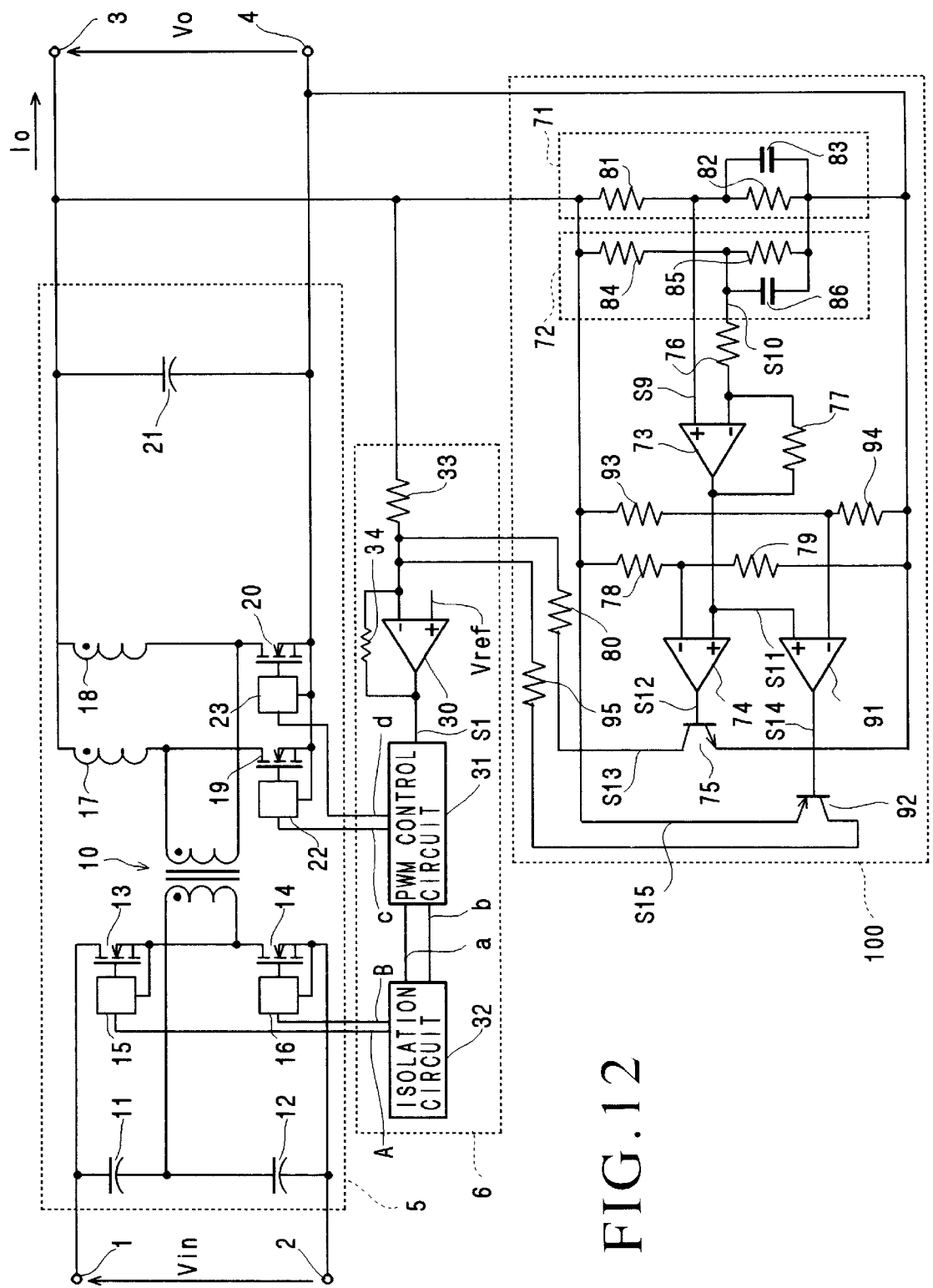
FIG. 12 is a circuit diagram of a switching power supply that is another preferred embodiment of the present invention.

FIG. 12 is a circuit diagram of a switching power supply that is another preferred embodiment of the present invention.

As shown in FIG. 12, the switching power supply of this embodiment differs from the switching power supply of FIG. 1 in that the abrupt load change detection circuit 7 is replaced by an abrupt load change detection circuit 100. Other aspects of the configuration are the same as those of the switching power supply shown in FIG. 1 and explanation thereof will not be repeated here.

The abrupt load change detection circuit 100 is equipped with a filter 71, a filter 72, an operational amplifier 73, a comparator 74, a comparator 91, a transistor 75, a transistor 92, and resistors 76–80 and 93–95.

The filters 71 and 72, configured as explained earlier, produce control signals S9 and S10, respectively. Similarly to what was explained in the foregoing, the operational amplifier 73 receives the control signals S9 and S10, and amplifies the level difference between them to produce a control signal S11. As also explained earlier, the comparators 74 and 91 respectively produce control signals S12 and S14 based on the control signal S11 and the corresponding one of a voltage Vo1 and a voltage Vo2. Also similarly to what was explained in the foregoing, the base of the transistor 75 is supplied with the control signal S12 and the collector thereof is connected to the inverting input (−) of the amplifier 30 through a resistor 80. Likewise, the base of the transistor 92 is supplied with the control signal S14 and the collector thereof is connected to the inverting input (−) of the amplifier 30 through a resistor 95.

As explained earlier, the voltage Vo1 is set higher than the level of the control signal S11 in the normal state and the voltage Vo2 is set lower than the level of the control signal S11 in the normal state.

The switching power supply equipped with the abrupt load change detection circuit 100 provides both the functional capability of the switching power supply shown in FIG. 8 and functional capability of the switching power supply shown in FIG. 10. That is to say, when the output voltage Vo decreases rapidly owing to an abrupt change in the load condition, the level of the control signal S1 can be rapidly increased because the control signal S12 output by the comparator 74 is activated (becomes high level). On the other hand, when the output voltage Vo increases rapidly owing to an abrupt change in the load condition, the level of the control signal S1 can be rapidly decreased because the control signal S14 output by the comparator 91 is activated (becomes low level). In the normal state, moreover, the abrupt load change detection circuit 100 has substantially no effect on the operation of the control circuit 6.

Hence, the switching power supply of this embodiment can recover quickly from a rapid decrease or increase in the output voltage Vo caused by an abrupt change in the load condition. When, for example, a CPU or DSP is driven as a load, therefore, it is possible to effectively prevent malfunctions that otherwise might be caused by power supply voltage fluctuations occurring when the CPU or DSP switches from the active state to the inactive state or from the inactive state to the active state.

Another preferred embodiment of the present invention will now be explained.

Figure 13:
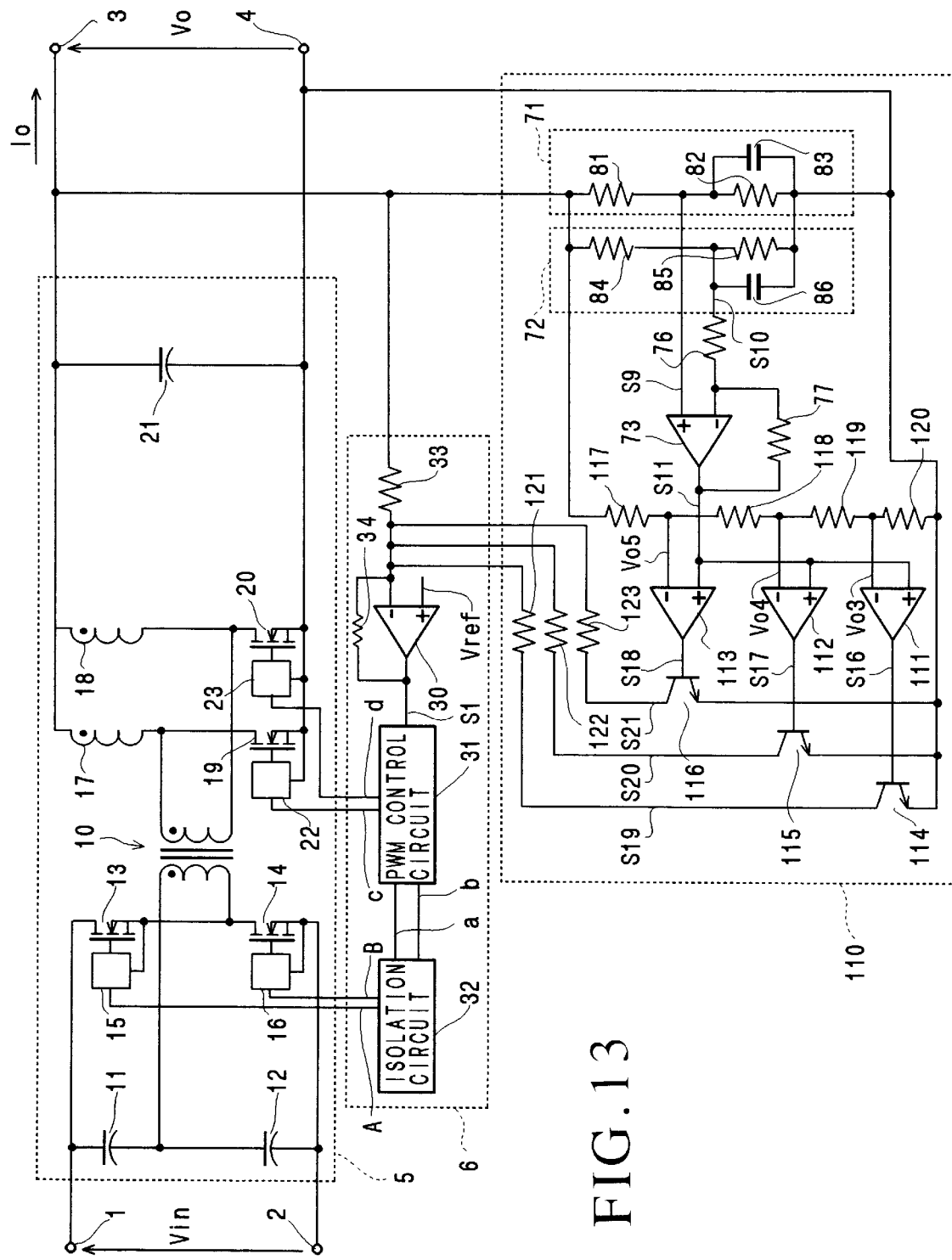
FIG. 13 is a circuit diagram of a switching power supply that is another preferred embodiment of the present invention.

FIG. 13 is a circuit diagram of a switching power supply that is another preferred embodiment of the present invention.

As shown in FIG. 13, the switching power supply of this embodiment differs from the switching power supply of FIG. 1 in that the abrupt load change detection circuit 7 is replaced by an abrupt load change detection circuit 110. Other aspects of the configuration are the same as those of the switching power supply shown in FIG. 1 and explanation thereof will not be repeated here.

The abrupt load change detection circuit 110 is configured similarly to the abrupt load change detection circuit 70 shown in FIG. 8. It differs from the abrupt load change detection circuit 70 in that the comparator 74 is replaced by three comparators 111–113, the transistor 75 is replaced by three transistors 114–116, the series connection of resistors 78 and 79 is replaced by a series connection of resistors 117–120, the resistor 80 is replaced by three resistors 121–123. Other aspects of the configuration are the same as those of the abrupt load change detection circuit 70 shown in FIG. 8 and explanation thereof will not be repeated here.

The comparator 111 has an inverting input (−), a non-inverting input (+) and an output. The control signal S11 is supplied to the non-inverting input (+) and a voltage Vo3 obtained by dividing the output voltage Vo using the resistors 117–119 and the resistor 120 is supplied to the inverting input (−). When the level of the control signal S11 is higher than the level of the voltage Vo3, therefore, a control signal S16 output by the comparator 111 becomes high level. Inversely, when the level of the control signal S11 is lower than the level of the voltage Vo3, the control signal S16 output by the comparator 111 becomes low level.

The comparator 112 has an inverting input (−), a non-inverting input (+) and an output. The control signal S11 is supplied to the non-inverting input (+) and a voltage Vo4 obtained by dividing the output voltage Vo using the resistors 117 and 118 and the resistors 119 and 120 is supplied to the inverting input (−). When the level of the control signal S11 is higher than the level of the voltage Vo4, therefore, a control signal S17 output by the comparator 112 becomes high level. Inversely, when the level of the control signal S11 is lower than the level of the voltage Vo4, the control signal S17 output by the comparator 112 becomes low level.

The comparator 113 has an inverting input (−), a non-inverting input (+) and an output. The control signal S11 is supplied to the non-inverting input (+) and a voltage Vo5 obtained by dividing the output voltage Vo using the resistor 117 and the resistors 118–120 is supplied to the inverting input (−). When the level of the control signal S11 is higher than the level of the voltage Vo5, therefore, a control signal S18 output by the comparator 113 becomes high level. Inversely, when the level of the control signal S11 is lower than the level of the voltage Vo5, the control signal S18 output by the comparator 113 becomes low level.

The transistor 114, though not particularly limited, can be an NPN bipolar transistor whose base is supplied with the control signal S16. The emitter of the transistor 114 is connected to the output terminal 4 (GND) and the collector of the transistor 114 is connected through a resistor 121 to the inverting input (−) of the amplifier 30.

The transistor 115, though not particularly limited, can be an NPN bipolar transistor whose base is supplied with the control signal S17. The emitter of the transistor 115 is connected to the output terminal 4 (GND) and the collector of the transistor 115 is connected through a resistor 122 to the inverting input (−) of the amplifier 30.

The transistor 116, though not particularly limited, can be an NPN bipolar transistor whose base is supplied with the control signal S18. The emitter of the transistor 116 is connected to the output terminal 4 (GND) and the collector of the transistor 116 is connected through a resistor 123 to the inverting input (−) of the amplifier 30.

The resistance values of the resistors 121–123 are preferably selected so that the composite resistance value thereof when connected in parallel is about the same as the resistance value of the resistors 35, 54, 80 and 95 used in the earlier embodiments.

Although not shown in FIG. 13, a capacitor is preferably added in parallel with the resistor 120 in order to stabilize the voltages Vo3–Vo5.

The relationship among the voltages Vo3, V04 and Vo5 is Vo3>Vo4>Vo5 in the abrupt load change detection circuit 110 of the foregoing configuration, When the output voltage Vo decreases owing to an abrupt change in the load condition, therefore, the resistance value between the inverting input (−) of the amplifier 30 and the output terminal 4 (GND) can be changed stepwise in accordance with the degree of decrease.

More specifically, when the level of the control signal S11 output by the operational amplifier 73 is such that S11<Vo3 (normal state), all of the transistors 114–116 are OFF, so that the control signals S19–S21 are in a high impedance state as viewed from the inverting input (−) of the amplifier 30. In this case, therefore, the abrupt load change detection circuit 110 has substantially no effect on the operation of the control circuit 6. The transfer function of the control circuit 6 assumes a first value and the transfer function of the closed loop composed of the main circuit unit 5 and the control circuit 6 is held to a value at which the output voltage Vo does not oscillate.

When the level of the control signal S11 output by the operational amplifier 73 is such that Vo3<S11<Vo4, the transistor 114 is ON and the transistors 115 and 116 are OFF, so that the inverting input (−) of the amplifier 30 is supplied with ground potential through the resistor 121. The control signal S1 therefore rises to a voltage level (VI) determined by the resistor 121. In this condition, the transfer function of the control circuit 6 assumes a second value exceeding the first value.

When the level of the control signal S11 output by the operational amplifier 73 is such that Vo4<S11<Vo5, the transistors 114 and 115 are ON and the transistor 116 is OFF, so that the inverting input (−) of the amplifier 30 is supplied with ground potential through the parallel connection of resistors 121 and 122. The control signal S1 therefore rises to a voltage level (V2 (>V1)) determined by the composite resistance value of the parallel connection of the resistors 121 and 122 (first composite resistance value). As the first composite resistance value is lower than the resistance value of the resistor 121 in this case, the control signal S1 rises faster than in the case where the level of the control signal S11 is such that Vo3<S11<Vo4. In this condition, the transfer function of the control circuit 6 assumes a third value exceeding the second value.

When the level of the control signal S11 output by the operational amplifier 73 is such that S11<Vo5, all of the transistors 114–116 are ON, so that that the inverting input (−) of the amplifier 30 is supplied with ground potential through the parallel connection of resistors 121–123. The control signal S1 therefore rises to a voltage level (V3 (>V2)) determined by the composite resistance value of the parallel connection of the resistors 121–123 (second composite resistance value). As the second composite resistance value is lower than the first composite resistance value in this case, the control signal S1 rises faster than in the case where the level of the control signal S11 is such that Vo4<S11<Vo5. In this condition, the transfer function of the control circuit 6 assumes a fourth value exceeding the third value. It is acceptable at this time for the level of the transfer function of the closed loop composed of the main circuit unit 5 and the control circuit 6 to become one at which the output voltage Vo oscillates.

Thus, in the switching power supply of this embodiment, when the output voltage Vo decreases owing to an abrupt change in the load condition, the level of the control signal S1 can be raised to a voltage level proportional to the degree of decrease in the output voltage Vo. Restoration of the output voltage Vo when it decreases rapidly owing to an abrupt change in the load condition can therefore be effected more accurately in the switching power supply of this embodiment than in the switching power supply shown in FIG. 8.

The switching power supply of this embodiment uses the three comparators 111–113 so that when the output voltage Vo decreases rapidly owing to an abrupt change in the load condition its restoration can be controlled in three stages. This is, however, only one example of the number of comparators and it is instead possible to use two comparators or four or more comparators.

Although not indicated in the drawings, just as the abrupt load change detection circuit 110 shown in FIG. 13 is configured by replacing the comparator 74 incorporated in the abrupt load change detection circuit 70 shown in FIG. 8 with the multiple comparators 111–113 having mutually different thresholds, it is also possible to replace the comparator 91 incorporated in the abrupt load change detection circuit 90 shown in FIG. 10 with multiple comparators having mutually different thresholds. Utilizing a so-configured abrupt load change detection circuit makes it possible to respond to an increase in the output voltage Vo owing to an abrupt change in the load condition by lowering the level of the control signal S1 to a voltage level proportional to the degree of increase in the output voltage Vo. By this, the restoration of the output voltage Vo when it increases rapidly owing to an abrupt change in the load condition can be effected more accurately than in the switching power supply shown in FIG. 10.

Although not indicated in the drawings, the comparator 74 and the comparator 91 incorporated in the abrupt load change detection circuit 100 shown in FIG. 12 can each be replaced with multiple comparators having mutually different thresholds. Utilizing a so-configured abrupt load change detection circuit makes it possible to respond to a decrease in the output voltage Vo owing to an abrupt change in the load condition by raising the level of the control signal S1 to a voltage level proportional to the degree of decrease in the output voltage Vo and also makes it possible to respond to an increase in the output voltage Vo owing to an abrupt change in the load condition by lowering the level of the control signal S1 to a voltage level proportional to the degree of increase in the output voltage Vo. By this, the restoration of the output voltage Vo when it decreases or increases rapidly owing to an abrupt change in the load condition can be effected more accurately than in the switching power supply shown in FIG. 12. In this case, the number of comparators used in place of the comparator 74 and the number of comparators used in place of the comparator 91 need not be the same.

In the switching power supplies of the embodiments explained in the foregoing, when the abrupt load change detection circuit detects an abrupt load change state, the output voltage Vo is rapidly restored by controlling the level of the inverting input (−) of the amplifier 30 incorporated in the control circuit 6. However, the present invention is not limited to this method of rapidly restoring the output voltage Vo when the abrupt load change detection circuit detects an abrupt load change state and any of various other methods can be adopted instead for rapidly restoring the output voltage Vo.

Figure 14:
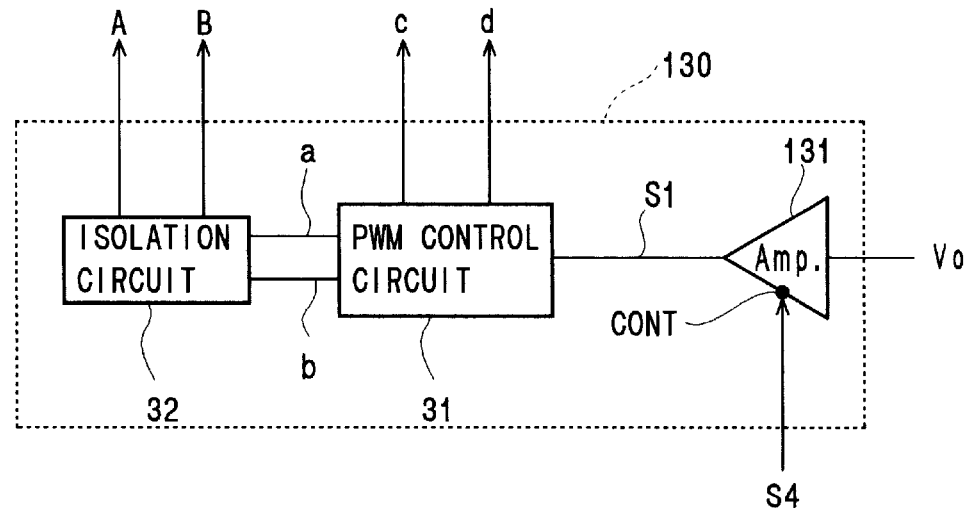
FIG. 14 is a circuit diagram of a control circuit 130 included in a switching power supply that is another preferred embodiment of the present invention.

FIG. 14 is a circuit diagram of a control circuit 130 included in a switching power supply that is another preferred embodiment of the present invention.

As shown in FIG. 14, the control circuit 130 comprises a variable amplifier 131, a PWM control circuit 31 and an isolation circuit 32.

The variable amplifier 131 has an input, an output and a control input (CONT). The output voltage Vo is applied to the input and the control signal S4 from the abrupt load change detection circuit 7 shown in FIG. 1 is applied to the control input (CONT). The control signal S1 produced on the output of the variable amplifier 131 is used as a control signal S1. The gain of the variable amplifier 131 varies with the level of the control signal S4 applied to the control input (CONT). Specifically, when the control signal S4 applied to the control input (CONT) is low level, the variable amplifier 131 assumes a first gain (normal gain), and when the control signal S4 applied to the control input (CONT) is high level, the variable amplifier 131 assumes a second gain higher than the first gain.

As explained earlier, the control signal S4 is activated (becomes high level) when the output voltage Vo decreases rapidly owing to an abrupt change in the load condition. The gain of the variable amplifier 131 is therefore the first gain in the normal state and the second gain in the abrupt load change state. As a result, the control signal S1 output by the variable amplifier 131 rises rapidly when the output voltage Vo decreases rapidly owing to an abrupt change in the load condition. As in the switching power supply shown in FIG. 1, this enables quick recovery from a rapid decrease in the output voltage Vo caused by an abrupt change in the load condition.

It is acceptable to set the second gain of the variable amplifier 131 to a high value at which the transfer function of the closed loop composed of the main circuit unit 5 and the control circuit 130 exceeds the limit value beyond which the output voltage Vo oscillates. When the variable amplifier 131 operates at such a high gain, the output voltage Vo eventually oscillates but since the control signal S4 activates only momentarily in the abrupt load change state, no substantial oscillation of the output voltage Vo occurs.

The signal supplied to the control input (CONT) of the variable amplifier 131 is not limited to the control signal S4 but can instead be any of the control signals S7, S12 and S14.

When, as in the abrupt load change detection circuit 110 shown in FIG. 13, use is made of control signals produced stepwise in response the degree of change in the output voltage Vo, like the control signals S16 S18, the variable amplifier 131 is preferably a variable amplifier capable of changing its gain stepwise in response to the control signals that are produced stepwise (in four steps when using the control signal S16–S18).

Another method of rapidly restoring the output voltage Vo will now be explained.

Figure 15:
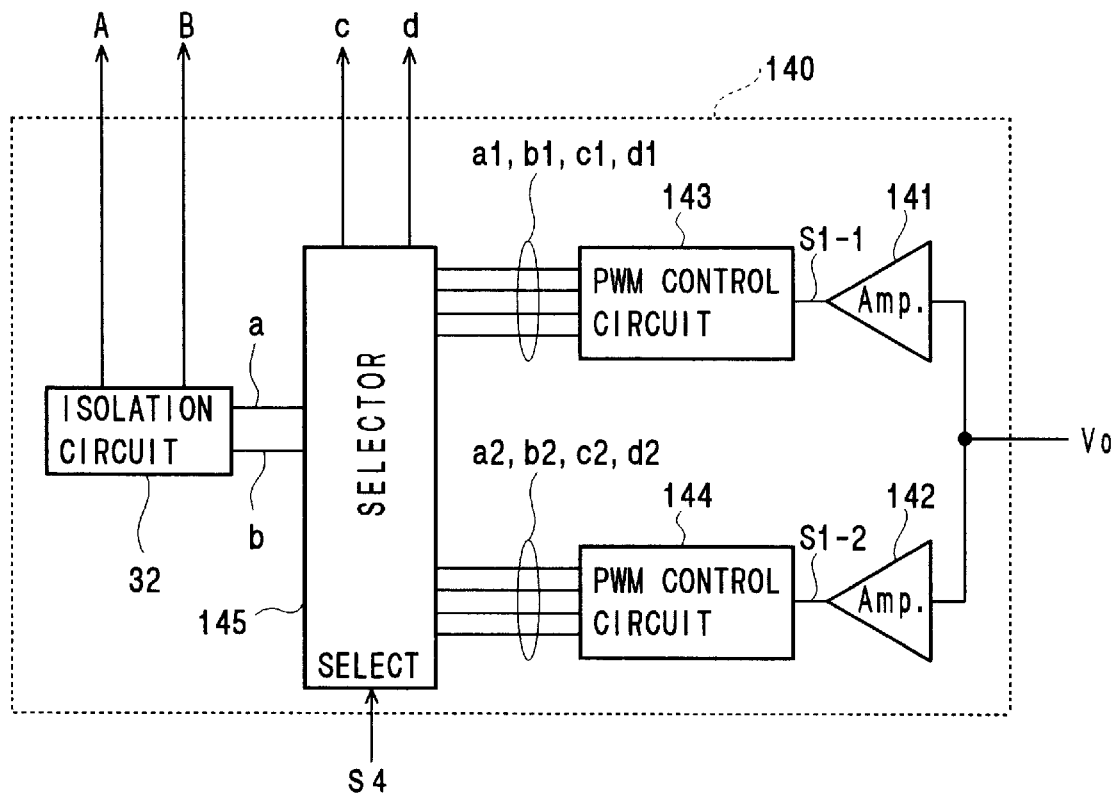
FIG. 15 is a circuit diagram of a control circuit 140 included in a switching power supply that is another preferred embodiment of the present invention.

FIG. 15 is a circuit diagram of a control circuit 140 included in a switching power supply that is another preferred embodiment of the present invention.

As shown in FIG. 15, the control circuit 140 comprises a first amplifier 141, a second amplifier 142, a first PWM control circuit 143, a second PWM control circuit 144, a selector 145

In the control circuit 140, gains of the first amplifier 141 and the second amplifier 142 are different. Specifically, the gain of the second amplifier 142 is set higher than the gain of the first amplifier 141. The first PWM control circuit 143 receives a control signal S1-1 output by the first amplifier 141 and controls the pulse widths of control signals a1, b1, c1 and d1 based thereon. The second PWM control circuit 144 receives a control signal S1-2 output by the second amplifier 142 and controls the pulse widths of control signals a2, b2, c2 and d2 based thereon. All of the control signals a1, b1, c1, d1, a2, b2, c2 and d2 are supplied to the selector 145. The selector 145 has a selection input (SELECT). When the control signal S4 applied to the selection input (SELECT) is low level, selector 145 selects and outputs the control signals a1, b1, c1 and d1. When the control signal S4 applied to the selection input (SELECT) is high level, the selector 145 selects and outputs the control signals a2, b2, c2 and d2.

As explained earlier, the control signal S4 is activated (becomes high level) when the output voltage Vo decreases rapidly owing to an abrupt change in the load condition. The selector 145 therefore selects the control signals a1, b1, c1 and d1 in the normal state and selects the control signals a2, b2, c2 and d2 in the abrupt load change state. When the output voltage Vo decreases rapidly owing to an abrupt change in the load condition, therefore, quick recovery from the rapid decrease in the output voltage Vo caused by the abrupt change in the load condition can be achieved as in the switching power supply of the FIG. 1.

It is acceptable to set the second gain of the second amplifier 142 to a high value at which the transfer function of the closed loop composed of the main circuit unit 5 and the control circuit 10 exceeds the limit value beyond which the output voltage Vo oscillates. Moreover, the signal supplied to the selection input (SELECT) of the selector 145 is not limited to the control signal S4 but can instead be any of the control signals S7, S12 and S14.

When, as in the abrupt load change detection circuit 110 shown in FIG. 13, use is made of control signals produced stepwise in response the degree of change in the output voltage Vo, like the control signals S16 S18, the number of amplifier and PWM control circuit pairs is preferably made three or more to match the number of steps (four pairs when using the control signals S16–S18).

Another method of rapidly restoring the output voltage Vo will now be explained.

Figure 16:
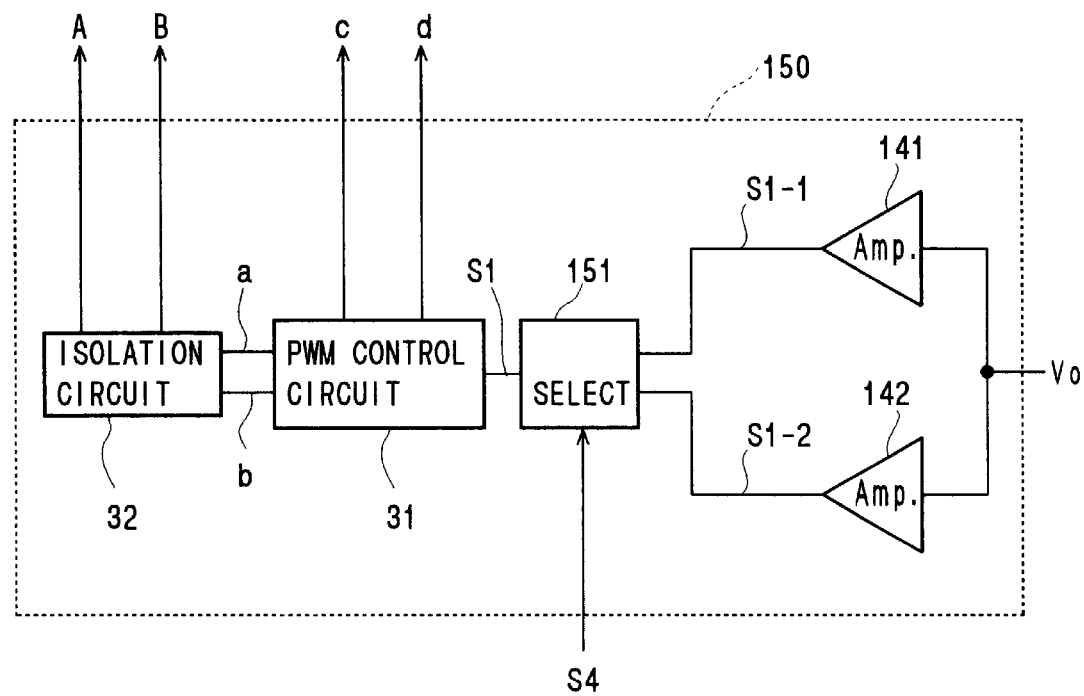
FIG. 16 is a circuit diagram of a control circuit 150 included in a switching power supply that is another preferred embodiment of the present invention.

FIG. 16 is a circuit diagram of a control circuit 150 included in a switching power supply that is another preferred embodiment of the present invention.

As shown in FIG. 16, the control circuit 150 comprises a first amplifier 141, a second amplifier 142, a selector 151, PWM control circuit 31 and an isolation circuit 32.

The selector 151 has a selection input (SELECT). When the control signal S4 applied to the selection input (SELECT) is low level, the selector 151 select control signals S1-1 output by the first amplifier 141 and supplies them to the PWM control circuit 31. When the control signal S4 applied to the selection input (SELECT) is high level, the selector 151 select control signals S1-2 output by the second amplifier 142 and supplies them to the PWM control circuit 31.

The control circuit 150 can therefore carry out substantially the same operations as the control circuit 140.

Figure 17:
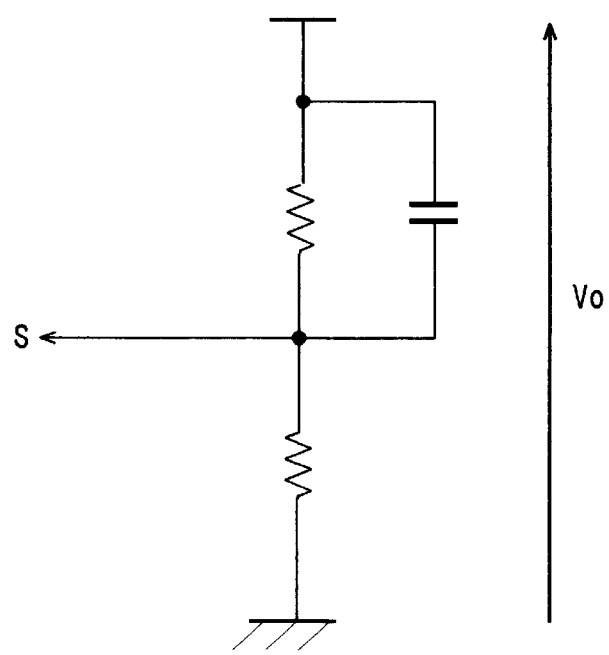
FIG. 17 is a circuit diagram of a high-pass filter.

The different embodiments of the switching power supply explained in the foregoing use low-pass filters as the filters incorporated in the abrupt load change detection circuit. However, the present invention does not require the filters incorporated in the abrupt load change detection circuit to be low-pass filters and they may instead be high-pass filters such as shown in FIG. 17, on the sole provision that their time constants are set to suitable values.

The different embodiments of the switching power supply explained in the foregoing use a half-bridge switching circuit as the primary circuit of the main circuit unit 5 and use a current doubler output circuit as the secondary circuit of the main circuit unit 5. However, the present invention does not limit the primary and secondary circuits of the main circuit unit 5 to these types and any of various other circuits can be used instead.

Examples of other primary circuits that can be adopted in the switching power supply of the present invention include full-bridge and push-pull circuits. Examples of other secondary circuits that can be adopted in the switching power supply of the present invention include forward, center tap and bridge circuits.

The different embodiments of the switching power supply explained in the foregoing use a main circuit unit 5 including a single transformer 10, a single primary circuit and single secondary circuit. However, the present invention also encompasses configurations of the main circuit unit 5 in which multiple sets composed of a transformer, primary circuit and secondary circuit are used, and it is acceptable to drive the multiple sets in mutually different phases.

It should be noted that the present invention is in no way limited to the details of the described arrangements but changes and modifications may be made without departing from the scope of the appended claims.

In the switching power supplies shown in FIGS. 8, 10, 12 and 13, for example, the control signal S11 output by the operational amplifier 73 is compared against the voltages Vo1 to Vo5 obtained by dividing the output voltage Vo. However, prescribed reference voltages can be used in place of the voltages Vo1 to Vo5, provided that in this case the reference voltages need to be changed when the desired value of the output voltage Vo is changed by the control circuit 6.

In the foregoing embodiments of the switching power supply, the output voltage Vo is directly supplied to the inputs of the amplifiers 30, 141 and 142 and the variable amplifier 131 included in the control circuits 6, 130, 140 and 150. However, these inputs can instead be supplied with a voltage that is covariant with the output voltage Vo, such as a voltage obtained by dividing the output voltage Vo using a plurality of series-connected resistors.

Although the control circuits 6, 130, 140 and 150 of the foregoing embodiments of the switching power supply conduct voltage mode control, control circuits that conduct current mold control can be used instead.

In the foregoing embodiments of the switching power supply, the control circuits 6, 130, 140 and 150 utilize the amplifiers 30, 141 and 142 and the variable amplifier 131 to produce the control signal S1 as an analog signal. They can, however, be adapted to conduct their operations by digital processing.

The abrupt load change detection circuits used in the foregoing embodiments are only examples of circuits that can be used for detecting abrupt load change and abrupt load change can instead be detected utilizing any of various other circuits.

Since, as explained in the foregoing, the present invention enables quick recovery from rapid decrease and/or increase of the output voltage Vo owing to abrupt change in the load condition, it provides a switching power supply that is markedly improved in transient response. Therefore, when the switching power supply of the present invention is used to drive a load whose load current changes abruptly, such as a CPU or DSP, it effectively prevents malfunctions of the load device that might otherwise be caused by power supply voltage fluctuation.

What is claimed is:

1. A switching power supply comprising:
 a main circuit unit including a switching circuit for converting a DC input voltage to an AC voltage and an output circuit for rectifying the AC voltage to produce a DC output voltage; and
 a control circuit for controlling the operation of the main circuit unit,
 a transfer function of the control circuit assuming a first value when a load current supplied by the main circuit unit changes at a rate not exceeding a prescribed rate and assuming a second value exceeding the first value when the load current changes at a rate exceeding the prescribed rate.

2. The switching power supply as claimed in claim 1, wherein the second value is set at a level such that a transfer function of a closed loop including the switching circuit and the control circuit causes oscillation of the output voltage.

3. The switching power supply as claimed in claim 1, wherein the control circuit includes at least an amplifier that receives the output voltage or a voltage covariant therewith at an input thereof and the switching power supply further comprises means responsive to a change in the load current at a rate exceeding the prescribed rate for changing the level at the input of the amplifier.

4. The switching power supply as claimed in claim 2, wherein the control circuit includes at least an amplifier that receives the output voltage or a voltage covariant therewith at an input thereof and the switching power supply further comprises means responsive to a change in the load current at a rate exceeding the prescribed rate for changing the level at the input of the amplifier.

5. The switching power supply as claimed in claim 4, wherein the means is responsive to an increase in the load current at a rate exceeding the prescribed rate for changing the level at the input of the amplifier in one direction and is responsive to a decrease in the load current at a rate exceeding the prescribed rate for changing the level at the input of the amplifier in the opposite direction.

6. The switching power supply as claimed in claim 4, wherein the means is responsive to a change in the load current at a first rate exceeding the prescribed rate for changing the level at the input of the amplifier to a first level and is responsive to a change in the load current at a second rate exceeding the first rate for changing the level at the input of the amplifier to a second level.

7. The switching power supply as claimed in claim 5, wherein the means is responsive to a change in the load current at a first rate exceeding the prescribed rate for changing the level at the input of the amplifier to a first level and is responsive to a change in the load current at a second rate exceeding the first rate for changing the level at the input of the amplifier to a second level.

8. The switching power supply as claimed in claim 3, wherein the means is responsive to an increase in the load current at a rate exceeding the prescribed rate for changing the level at the input of the amplifier in one direction and is responsive to a decrease in the load current at a rate exceeding the prescribed rate for changing the level at the input of the amplifier in the opposite direction.

9. The switching power supply as claimed in claim 3, wherein the means is responsive to a change in the load current at a first rate exceeding the prescribed rate for changing the level at the input of the amplifier to a first level and is responsive to a change in the load current at a second rate exceeding the first rate for changing the level at the input of the amplifier to a second level.

10. The switching power supply as claimed in claim 8, wherein the means is responsive to a change in the load current at a first rate exceeding the prescribed rate for changing the level at the input of the amplifier to a first level and is responsive to a change in the load current at a second rate exceeding the first rate for changing the level at the input of the amplifier to a second level.

11. The switching power supply as claimed in claim 1, wherein the control circuit receives the output voltage or a voltage covariant therewith at an input thereof and includes at least a variable amplifier that assumes a first characteristic when the load current changes at a rate not exceeding the prescribed rate and assumes a second characteristic different from the first characteristic when the load current changes at a rate exceeding the prescribed rate.

12. The switching power supply as claimed in claim 11, wherein the first characteristic is a first gain and the second characteristic is a second gain exceeding the first gain.

13. The switching power supply as claimed in claim 1, wherein the control circuit includes at least a plurality of amplifiers that differ in characteristics and each receive the output voltage or a voltage covariant therewith at inputs thereof, a plurality of PWM control circuits associated one each with the amplifiers for producing control signal groups based on outputs of the associated amplifiers, and a selector for selecting one signal group from among the control signal groups based on whether or not the load current changed at a rate exceeding the prescribed rate, the operation of the main circuit unit being controlled based on the selected control signal group.

14. The switching power supply as claimed in claim 1, wherein the control circuit includes at least a plurality of amplifiers that differ in characteristics and each receive the output voltage or a voltage associated therewith at inputs thereof, a selector for selecting one output from among outputs of the plurality of amplifiers based on whether or not the load current changed at a rate exceeding the prescribed rate, and a PWM control circuit for producing a control signal group based on the selected output, the operation of the main circuit unit being controlled based on the control signal group.

15. The switching power supply as claimed in claim 2, wherein the control circuit receives the output voltage or a voltage covariant therewith at an input thereof and includes at least a variable amplifier that assumes a first characteristic when the load current changes at a rate not exceeding the prescribed rate and assumes a second characteristic different from the first characteristic when the load current changes at a rate exceeding the prescribed rate.

16. The switching power supply as claimed in claim 15, wherein the first characteristic is a first gain and the second characteristic is a second gain exceeding the first gain.

17. The switching power supply as claimed in claim 2, wherein the control circuit includes at least a plurality of amplifiers that differ in characteristics and each receive the output voltage or a voltage covariant therewith at inputs thereof, a plurality of PWM control circuits associated one each with the amplifiers for producing control signal groups based on outputs of the associated amplifiers, and a selector for selecting one signal group from among the control signal groups based on whether or not the load current changed at a rate exceeding the prescribed rate, the operation of the main circuit unit being controlled based on the selected control signal group.

18. The switching power supply as claimed in claim 2, wherein the control circuit includes at least a plurality of amplifiers that differ in characteristics and each receive the output voltage or a voltage associated therewith at inputs thereof, a selector for selecting one output from among outputs of the plurality of amplifiers based on whether or not the load current changed at a rate exceeding the prescribed rate, and a PWM control circuit for producing a control signal group based on the selected output, the operation of the main circuit unit being controlled based on the control signal group.

\* \* \* \* \*

UNITED STATES PATENT AND TRADEMARK OFFICE
CERTIFICATE OF CORRECTION

PATENT NO.        : 6,683,798 B1
APPLICATION NO. : 10/218050
DATED             : January 27, 2004
INVENTOR(S)       : Matsuura, Ken et al.

It is certified that error appears in the above-identified patent and that said Letters Patent is hereby corrected as shown below:

Title Page
Item (56) References Cited US Pat. Doc. should include:
    6,232,755   B1         5/2001         Zhang ........................... 323/282

Signed and Sealed this

Twenty-ninth Day of August, 2006

JON W. DUDAS
*Director of the United States Patent and Trademark Office*